US010414244B2

(12) United States Patent
Kozasa

(10) Patent No.: US 10,414,244 B2
(45) Date of Patent: Sep. 17, 2019

(54) REFRIGERATION SYSTEM, AND IN-VEHICLE REFRIGERATION SYSTEM

(71) Applicant: DENSO CORPORATION, Kariya, Aichi-pref. (JP)

(72) Inventor: Tetsuo Kozasa, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/741,137

(22) PCT Filed: Jun. 23, 2016

(86) PCT No.: PCT/JP2016/068711
§ 371 (c)(1),
(2) Date: Dec. 29, 2017

(87) PCT Pub. No.: WO2017/006775
PCT Pub. Date: Jan. 12, 2017

(65) Prior Publication Data
US 2018/0194197 A1  Jul. 12, 2018

(30) Foreign Application Priority Data

Jul. 8, 2015 (JP) ................. 2015-137180

(51) Int. Cl.
*B60H 1/22* (2006.01)
*F25B 5/02* (2006.01)
(Continued)

(52) U.S. Cl.
CPC .......... *B60H 1/22* (2013.01); *B60H 1/00207* (2013.01); *B60H 1/2215* (2013.01); *B60H 1/323* (2013.01);
(Continued)

(58) Field of Classification Search
CPC .. B60H 1/2215; B60H 1/00207; B60H 1/323; B60H 2001/3289; B60H 2001/00242;
(Continued)

(56) References Cited

U.S. PATENT DOCUMENTS 5,042,567 A  8/1991  Kajimoto et al.
6,266,967 B1  7/2001  Honda
(Continued)

FOREIGN PATENT DOCUMENTS

JP  S60255524 A  12/1985
JP  S63-6387 A  1/1988
(Continued)

*Primary Examiner* — Ana M Vazquez
(74) *Attorney, Agent, or Firm* — Harness, Dickey & Pierce, P.L.C.

(57) ABSTRACT

A refrigeration system includes a primary evaporator that cooperates with a compressor, which compresses first refrigerant containing lubricant oil, to form a refrigeration cycle that circulates the first refrigerant. At the primary evaporator, the first refrigerant absorbs heat from second refrigerant and is thereby evaporated. The refrigeration system further includes a condenser, at which the second refrigerant releases heat to the first refrigerant and is thereby condensed. The refrigeration system also includes a secondary evaporator that cooperates with the condenser to form a refrigerant circulation circuit, in which the second refrigerant is circulated. At the secondary evaporator, the secondary evaporator absorbs heat from a primary cooling subject and is thereby evaporated. A refrigerant flow passage of the primary evaporator and a refrigerant flow passage of the condenser are independently formed, so that the refrigeration cycle and the refrigerant circulation circuit are independently formed.

15 Claims, 12 Drawing Sheets

US 10,414,244 B2
Page 2

(51) Int. Cl.

| | | |
|---|---|---|
| *F25B 5/04* | (2006.01) | |
| *F28D 1/053* | (2006.01) | |
| *F28D 15/06* | (2006.01) | |
| *B60H 1/32* | (2006.01) | |
| *F25B 1/04* | (2006.01) | |
| *F25B 39/04* | (2006.01) | |
| *F28D 15/02* | (2006.01) | |
| *F25B 5/00* | (2006.01) | |
| *F25B 23/00* | (2006.01) | |
| *F25B 25/00* | (2006.01) | |
| *F28D 1/04* | (2006.01) | |
| *B60H 1/00* | (2006.01) | |
| *F25B 39/02* | (2006.01) | |
| *F28D 21/00* | (2006.01) | |

(52) U.S. Cl.
CPC ............ *B60H 1/3227* (2013.01); *F25B 1/04* (2013.01); *F25B 5/00* (2013.01); *F25B 5/02* (2013.01); *F25B 5/04* (2013.01); *F25B 23/006* (2013.01); *F25B 25/005* (2013.01); *F25B 39/04* (2013.01); *F28D 1/0435* (2013.01); *F28D 1/0461* (2013.01); *F28D 1/053* (2013.01); *F28D 1/05316* (2013.01); *F28D 1/05391* (2013.01); *F28D 15/0266* (2013.01); *F28D 15/0275* (2013.01); *F28D 15/06* (2013.01); *B60H 2001/00242* (2013.01); *B60H 2001/2259* (2013.01); *B60H 2001/3289* (2013.01); *F25B 39/028* (2013.01); *F28D 2021/0084* (2013.01); *F28D 2021/0085* (2013.01)

(58) Field of Classification Search
CPC ....... B60H 1/22; B60H 1/3227; F28D 1/0435; F28D 15/0266; F28D 1/05391; F28D 2021/0084; F25B 25/005; F25B 5/00; F25B 1/04; F25B 5/02
See application file for complete search history.

(56) References Cited

U.S. PATENT DOCUMENTS

| | | |
|---|---|---|
| 2004/0107716 A1 | 6/2004 | Hirota |
| 2004/0250995 A1 | 12/2004 | Morishita et al. |
| 2005/0066674 A1 | 3/2005 | Hirota et al. |
| 2007/0095098 A1 | 5/2007 | Lee et al. |
| 2011/0113800 A1 | 5/2011 | Sekiya et al. |
| 2011/0232873 A1* | 9/2011 | Seki ...................... F25B 25/005 165/104.21 |
| 2012/0312019 A1* | 12/2012 | Rechtman ............. F22B 1/1815 60/645 |
| 2014/0326010 A1 | 11/2014 | Kawakami et al. |
| 2015/0241131 A1* | 8/2015 | Katoh ................. F28D 1/05366 165/140 |
| 2015/0338173 A1 | 11/2015 | Katoh |

FOREIGN PATENT DOCUMENTS

| | | | |
|---|---|---|---|
| JP | H01-247966 A | 10/1989 | |
| JP | H01278822 A | 11/1989 | |
| JP | H07037727 U | 7/1995 | |
| JP | H10160368 A | 6/1998 | |
| JP | 2000283576 A | 10/2000 | |
| JP | 2001193517 A | 7/2001 | |
| JP | 2001289578 A | 10/2001 | |
| JP | 2003002042 A | 1/2003 | |
| JP | 2003004341 A | 1/2003 | |
| JP | 2003035461 A | 2/2003 | |
| JP | 2004144462 A | 5/2004 | |
| JP | 2004309081 A | 11/2004 | |
| JP | 2004345606 A | 12/2004 | |
| JP | 2005098597 A | 4/2005 | |
| JP | 2005273998 A | 10/2005 | |
| JP | 2007126134 A | 5/2007 | |
| JP | 2007269217 A | 10/2007 | |
| JP | 2008261603 A | 10/2008 | |
| JP | 2009019847 A | 1/2009 | |
| JP | 2009063192 A | 3/2009 | |
| JP | 2009068786 A | 4/2009 | |
| JP | 2009168337 A * | 7/2009 | |
| JP | 2009241773 A | 10/2009 | |
| JP | 2011-105150 A | 11/2009 | |
| JP | 2010-116135 A | 5/2010 | |
| JP | 2010-276285 A | 9/2010 | |
| JP | 2013068370 A * | 4/2013 | |
| JP | 2013250035 A | 12/2013 | |
| JP | 2014020675 A | 2/2014 | |
| JP | 2014095484 A * | 5/2014 | ................ F25B 5/00 |
| JP | 2014126339 A | 7/2014 | |
| WO | WO-2013093991 A1 | 6/2013 | |

* cited by examiner

REFRIGERATION SYSTEM, AND IN-VEHICLE REFRIGERATION SYSTEM

CROSS REFERENCE TO RELATED APPLICATIONS

This application is a U.S. National Phase Application under 35 U.S.C. 371 of International Application No. PCT/JP2016/068711 filed on Jun. 23, 2016 and published in Japanese as WO 2017/006775 A1 on Jan. 12, 2017. This application is based on and claims the benefit of priority from Japanese Patent Application No. 2015-137180 filed on Jul. 8, 2015. The entire disclosures of all of the above applications are incorporated herein by reference.

TECHNICAL FIELD

The present disclosure relates to a refrigeration system and an in-vehicle refrigeration system.

BACKGROUND ART

Previously, there is a case where a refrigeration cycle for an in-vehicle air conditioning apparatus includes: primary and secondary evaporators, which cool inside air of a cabin of the vehicle; and first and second blowers, which generate a flow of the inside air of the cabin that passes through the primary and secondary evaporators. The patent literature 1 discloses a technique, in which the primary and secondary evaporators are connected in parallel between a refrigerant inlet of a compressor and a refrigerant outlet of a condenser in the above-described type of refrigeration cycle.

According to this technique, first and second electromagnetic valves are provided to close refrigerant inlets of the primary and secondary evaporators. Therefore, a flow of lubricant oil to one of the primary and secondary evaporators can be limited by closing the refrigerant inlet of the one of the primary and secondary evaporators through the corresponding one of the first and second electromagnetic valves. Therefore, at the time of stopping one of the first and second blowers, which corresponds to the one of the primary and secondary evaporators, accumulation of the lubricant oil at the one of the primary and secondary evaporators can be limited by closing the corresponding one of the first and second electromagnetic valves.

In contrast, the patent literature 2 discloses another technique of performing an oil return control operation where the lubricant oil, which is accumulated in the one (hereinafter referred to as a stopped evaporator) of the primary and secondary evaporators, which corresponds to the stopped one of the first and second blowers, to the compressor.

According to this technique, first and second expansion valves are respectively provided to the refrigerant inlets of the primary and secondary evaporators. The oil return control operation repeats turning on and turning off of the compressor several times within a short period of time. The oil return control operation uses the phenomenon of that the expansion valve of the stopped evaporator among the first and second expansion valves is temporarily opened in response to the turning on and turning off of the compressor. When the expansion valve is opened, a flow of the refrigerant from the refrigerant outlet of the compressor to the stopped evaporator through the expansion valve is generated. In this way, the lubricant oil, which is accumulated in the stopped evaporator, can be returned to the inlet of the compressor.

CITATION LIST

Patent Literature

PATENT LITERATURE 1: JP2001-193517A
PATENT LITERATURE 2: JP2000-283576A

SUMMARY OF INVENTION

In the refrigeration system of the patent literature 1, the accumulation of the lubricant oil at the stopped evaporator is limited in advance by closing the electromagnetic valve at the inlet side of the stopped evaporator. However, it is necessary to provide the first and second electromagnetic valves to the inlets of the primary and secondary evaporators.

In the refrigeration system of the patent literature 2, the lubricant oil, which is accumulated in the stopped evaporator, can be returned to the inlet of the compressor by executing the oil return control operation. However, the temperature of the refrigerant, which flows in the operated evaporator, which is other than the stopped evaporator among the primary and secondary evaporators, is disadvantageously increased. Therefore, the inside air of the cabin of the vehicle cannot be sufficiently cooled by the other evaporator. The operated evaporator is an evaporator, at which a flow of the inside air of the cabin that passes through the operated evaporator is generated by the corresponding blower.

The inventor of the present application has studied the refrigeration system that avoids the flow of the lubricant oil from the compressor to the secondary evaporator among the primary and secondary evaporators without using the electromagnetic valve.

The present disclosure is made in view of the above point, and it is an objective of the present disclosure to provide a refrigeration system and an in-vehicle refrigeration system, each of which is configured such that a refrigeration cycle and a refrigerant circulation circuit are separated from each other while the refrigeration cycle includes a compressor and a primary evaporator, and the refrigerant circulation circuit includes a secondary evaporator.

According to one aspect of the present disclosure, a refrigeration system includes:

a primary evaporator that constitutes a refrigeration cycle in corporation with a compressor, which compresses first refrigerant that includes lubricant oil, wherein the refrigeration cycle circulates the first refrigerant, and the primary evaporator absorbs heat from the second refrigerant and thereby evaporates the first refrigerant;

a condenser that releases heat from the second refrigerant to the first refrigerant and thereby condenses the second refrigerant; and a secondary evaporator that constitutes a refrigerant circulation circuit, which circulates the second refrigerant, in corporation with the condenser, wherein the secondary evaporator absorbs heat from a primary cooling subject and thereby evaporates the second refrigerant after the second refrigerant is condensed, wherein:

a refrigerant flow passage of the primary evaporator and a refrigerant flow passage of the condenser are formed independently from each other, and thereby the refrigeration cycle and the refrigerant circulation circuit are formed independently from each other.

According to the above aspect, it is possible to provide the refrigeration system where the refrigeration cycle, which includes the compressor and the primary evaporator, and the refrigeration cycle, which includes the secondary evaporator, are formed separately from each other. Thereby, it is possible to limit mixing of the first refrigerant and the second refrigerant. Thus, it is possible to avoid conduction of the lubricant oil in the secondary evaporator.

DESCRIPTION OF EMBODIMENTS

Hereinafter, embodiments will be described with reference to the drawings. In each of the following embodiments, components, which are equal to each other or equivalent to each other, will be indicated by the same reference signs to simplify the description.

First Embodiment

Figure 1:
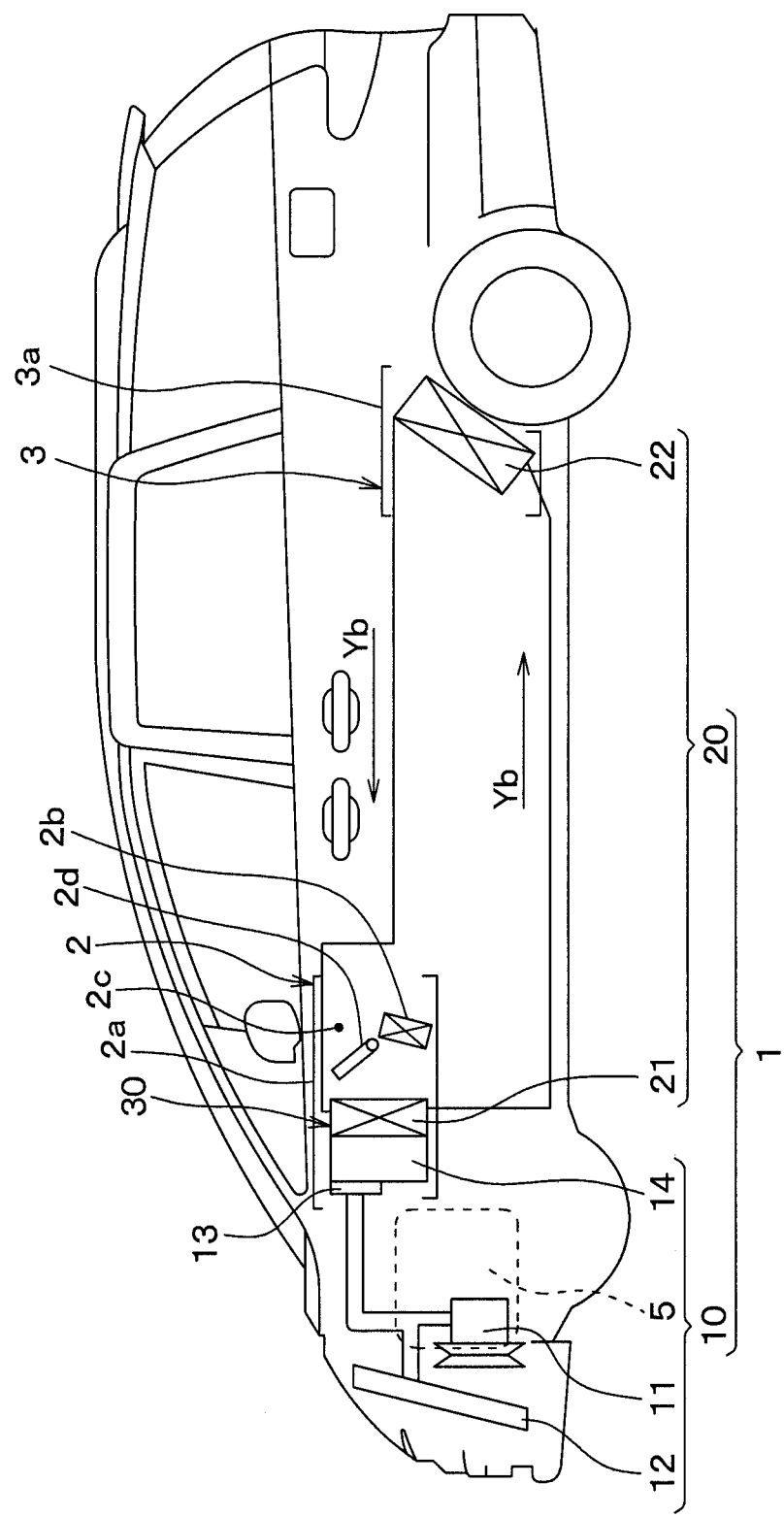
FIG. 1 is a view showing an entire structure of an in-vehicle refrigeration system according to a first embodiment.

Hereinafter, a first embodiment will be described. FIG. 1 shows a layout of an entire arrangement of the present disclosure, in which an in-vehicle refrigeration system 1 is applied to an automobile (i.e., a vehicle).

The in-vehicle refrigeration system 1 is installed to the automobile and includes a front-seat-side air conditioning unit 2 and a rear-seat-side air conditioning unit 3.

The front-seat-side air conditioning unit 2 is placed in an inside of an instrument panel at a foremost location of a cabin (vehicle cabin) of the automobile. The front-seat-side air conditioning unit 2 performs air conditioning of a front-seat-side region of the cabin. The front-seat-side air conditioning unit 2 includes a case 2a, which forms an air passage, and a blower (not shown), which is placed at an upstream portion of the case 2a. The blower blows inside air of the cabin (cabin inside air) or outside air of the cabin (cabin outside air), which is switched and introduced through an inside/outside air switching box (not shown). Hereinafter, the inside air of the cabin will be referred to as inside air, and the outside air of the cabin will be referred to as outside air.

An evaporator 14 of a refrigeration cycle 10 is placed as a cooling heat exchanger that cools the blown air on the downstream side of the blower. The refrigeration cycle 10 of the present embodiment is a known vapor-compression refrigeration cycle and includes a compressor 11 that is driven by an engine 5 of the automobile through an electromagnetic clutch.

The refrigerant is compressed by the compressor 11 to have high temperature and high pressure. The gas refrigerant, which is discharged from the compressor 11, is guided to a condenser 12. At the condenser 12, the gas refrigerant exchanges heat with the outside air, which is blown by a cooling fan (not shown), so that the gas refrigerant is condensed. The refrigerant, which has passed through the condenser 12, is depressurized by a pressure reducing valve 13 and thereby becomes low pressure refrigerant. At the evaporator 14, the low refrigerant after depressurization absorbs the heat from the inside air and is thereby evaporated. The gas refrigerant after the evaporation at the evaporator 14 is suctioned into the compressor 11 once again and is compressed. The inside air, from which the heat is absorbed by the low pressure refrigerant at the evaporator 14, is the air located at the front side of the cabin in the traveling direction of the automobile. The air located at the front side of the cabin in the traveling direction of the automobile is a second cooling subject and is an additional cooling subject that is other than the second refrigerant.

At the front-seat-side air conditioning unit 2, a heater core 2b, which heats the conditioning air by hot water supplied from the engine of the automobile, is placed on the downstream side of the evaporator 14 in the air flow direction. A bypass passage 2c is formed at a side of the heater core 2b. An air mix door 2d is rotatably placed at a location that is adjacent to the heater core 2b. By selecting a rotational position of the air mix door 2d, a ratio between a flow quantity of the warm air, which has been heated by passing through the heater core 2b, and a flow quantity of the cold air, which passes through the bypass passage 2c, is adjusted, and thereby a temperature of the air to be blown into the cabin of the automobile is adjusted.

Here, a defroster discharge opening, a face-side discharge opening, and a foot-side discharge opening (not shown) are opened at a downstream end part of the front-seat-side air conditioning unit 2. Each of these openings is opened and closed by a corresponding discharge mode door (not shown). The conditioning air flows, which have respectively passed through the defroster discharge opening, the face-side discharge opening and the foot-side discharge opening, are respectively discharged toward an inner surface of an automobile window glass, a head of a front-seat-side occupant, and feet of the front-seat-side occupant.

Next, the rear-seat-side air conditioning unit 3 is placed at a rear side of the automobile (e.g., a lateral side of the rear seat) to perform the air conditioning of the rear seat side of the cabin of the automobile. A blower (not shown), which draws the inside air and discharges the drawn air, is placed in an inside of a case 3a of the rear-seat-side air conditioning unit 3. A rear-seat-side evaporator 22 is placed on the downstream side of this blower. The inside air, which is drawn into this blower, is the air located at the rear side of the cabin in the traveling direction of the automobile.

The evaporator 22 cools the inside air, which is discharged from the blower, with the refrigerant. The evaporator 22 cooperates with the condenser 21 to constitute a refrigerant circulation circuit 20, which circulates the refrigerant. The refrigerant circulation circuit 20 circulates the refrigerant according to the principle of thermosiphon. The evaporator 22 and the condenser 21 are constructed such that the refrigerant in the refrigerant circulation circuit 20 and the refrigerant in the refrigeration cycle 10 flow independently from each other.

The refrigerant, which is circulated in the refrigeration cycle 10, contains lubricant oil. The lubricant oil is used to lubricate, for example, bearings and a compression mechanism of the compressor 11. Hereinafter, for the descriptive purpose, the refrigerant, which is circulated in the refrigeration cycle 10, will be referred to as first refrigerant, and the refrigerant, which is circulated in the refrigerant circulation circuit 20, will be referred to as second refrigerant.

In the present embodiment, refrigerant, such as HFC-134a, is used as the first refrigerant and the second refrigerant.

At the rear-seat-side air conditioning unit 3, the face-side discharge opening and the discharge mode door are placed at a location that is immediately after the evaporator 22 in the air flow direction. The cold air, which is cooled by the evaporator 22, is discharged from the face-side discharge opening through a discharge outlet toward a rear-seat-side occupant after passing through a rear-seat-side face duct.

The condenser 21 and the evaporator 14 constitute a refrigerant heat exchanger 30 that exchanges the heat between the first refrigerant and the second refrigerant. Specifically, the condenser 21 cools and condenses the second refrigerant through use of the heat exchange with the refrigerant, which flows in the evaporator 14.

Figure 2A:
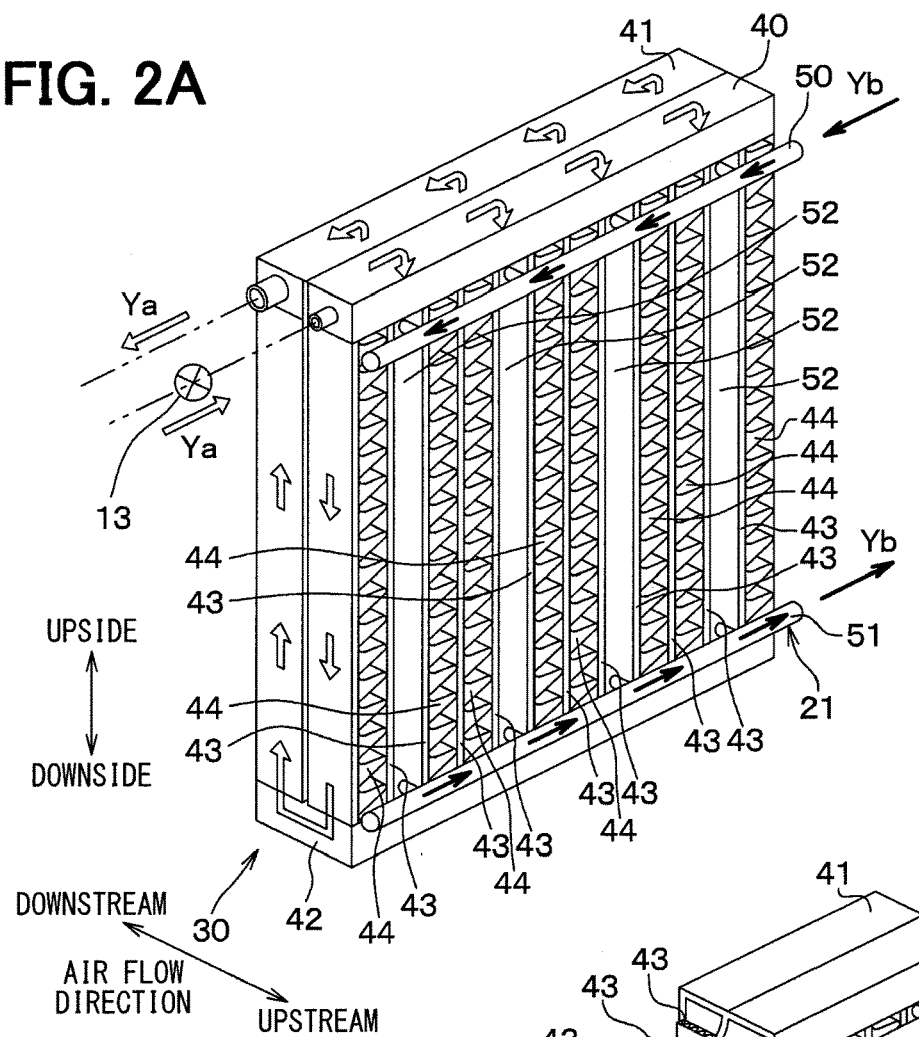
FIG. 2A is a perspective view showing only a refrigerant heat exchanger shown in FIG. 1.
Figure 2B:
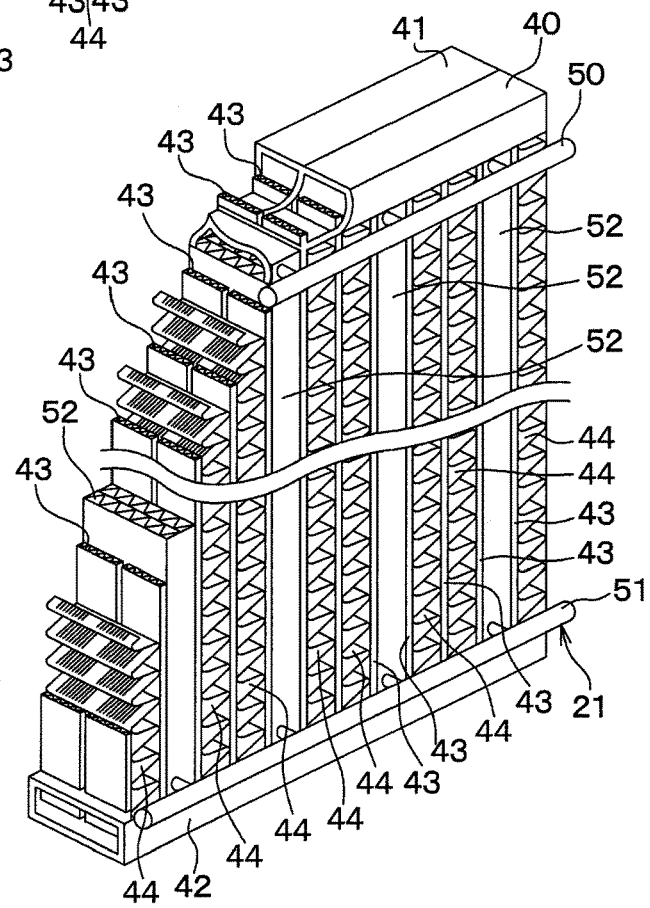
FIG. 2B is a cutaway view of the refrigerant heat exchanger shown in FIG. 1.

Next, the structure of the refrigerant heat exchanger 30 of the present embodiment will be described with reference to FIGS. 2A and 2B. In FIGS. 2A and 2B, an arrow Ya indicates a flow direction of the first refrigerant, and an arrow Yb indicates a flow direction of the second refrigerant.

The refrigerant heat exchanger 30 includes tanks 40, 41, 42, a plurality of tubes 43, a plurality of corrugated fins 44, tanks 50, 51 and a plurality of tubes 52.

The tubes 43 are arranged in two rows, which are placed one after the other in the air flow direction. Hereinafter, for the descriptive purpose, the tubes 43, which are arranged in the row located on the upstream side in the air flow direction, will be referred to as a plurality of upstream-side tubes 43. Furthermore, the tubes 43, which are arranged in the row located on the downstream side in the air flow direction, will be referred to as a plurality of downstream-side tubes 43.

The upstream-side tubes 43 are arranged one after another in a direction that is perpendicular to the air flow direction. The downstream-side tubes 43 are arranged one after another in the direction that is perpendicular to the air flow direction.

The tank 40 distributes the low pressure refrigerant, which is supplied from the pressure reducing valve 13, to the respective upstream-side tubes 43. The tank 42 collects the refrigerant outputted from the upstream-side tubes 43 and distributes this collected refrigerant to the downstream-side tubes 43. The tank 41 collects the refrigerant outputted from the downstream-side tubes 43 and supplies this collected refrigerant to an inlet of the compressor 11.

The tubes 52 are spaced from each other and are arranged one after another in the direction of the row of the tubes 43 (hereinafter referred to as a tube row direction). In other words, the tubes 52 are arranged one after another in the direction that is perpendicular to the air flow direction. Each of the tubes 52 is clamped between corresponding adjacent two of the upstream-side tubes 43 and is also clamped between corresponding adjacent two of the downstream-side tubes 43.

Thereby, the heat exchange takes place between the second refrigerant, which is conducted through the tubes 52, and the first refrigerant, which is conducted through the upstream-side tubes 43, and the heat exchange also takes place between the second refrigerant, which is conducted through the tubes 52 and the first refrigerant, which is conducted through the downstream-side tubes 43.

That is, the refrigerant flow passage, which is formed by the tubes 52, the refrigerant flow passage, which is formed by the tubes 43, are formed independently from each other, so that the heat exchange takes place between the first refrigerant and the second refrigerant.

The corrugated fins 44 are placed between each corresponding adjacent two of the upstream-side tubes 43. Also, the corrugated fins 44 are placed between each corresponding adjacent two of the downstream-side tubes 43. The corrugated fins 44 are placed at the surfaces of the corresponding tubes 43 to increase a heat exchange surface area of these tubes 43.

In the present embodiment, the upstream-side tubes 43, the tubes 52 and the corrugated fins 44 are arranged in the tube row direction. Also, the downstream-side tubes 43, the tubes 52 and the corrugated fins 44 are arranged in the tube row direction.

In the refrigerant heat exchanger 30 of the present embodiment, the tanks 40, 41, 42, 50, 51, the tubes 53, the tubes 52 and the corrugated fins 44 are integrally formed by, for example, integral brazing.

Figure 3:
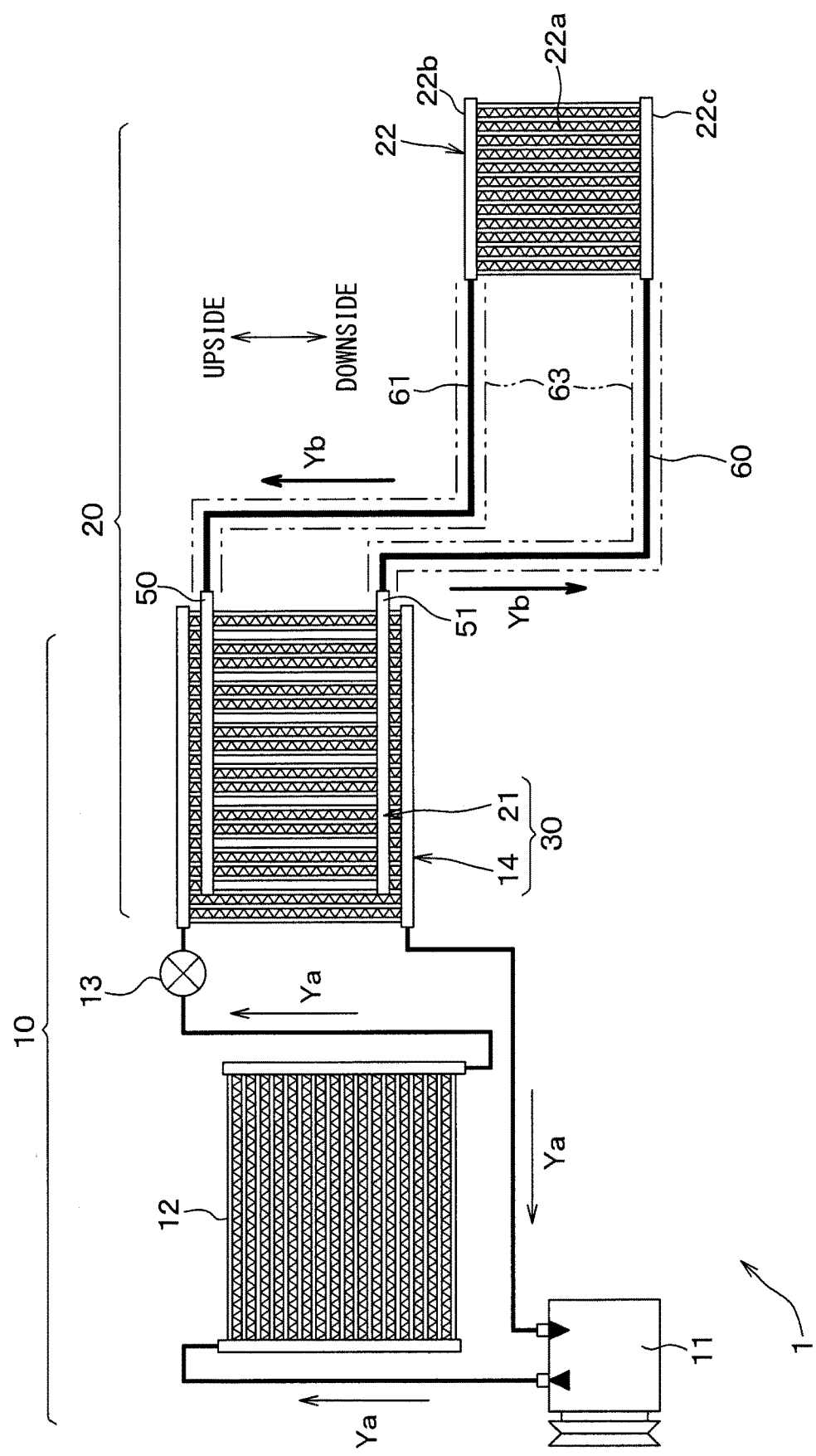
FIG. 3 is a view showing a structure of the in-vehicle refrigeration system according to the first embodiment.

FIG. 3 shows the structures of the refrigeration cycle 10 and the refrigerant circulation circuit 20.

The tank 50 distributes the refrigerant, which is received from a tank 22b of the evaporator 22, to the tubes 52. The tank 51 supplies the refrigerant, which is received from the tubes 52, to a tank 22c of the evaporator 22.

In the refrigerant heat exchanger 30, which is constructed in the above-described manner, the tanks 40, 41, 42, the tubes 43 and the corrugated fins 44 constitute the evaporator 14. The tanks 50, 51 and the tubes 52 constitute the condenser 21.

Here, the refrigerant flow passage, which is formed by the tanks 40, 41, 42, and the refrigerant flow passage, which is formed by the tanks 50, 51, are formed independently from each other. The refrigerant flow passage, which is formed by the tubes 43, and the refrigerant flow passage, which is formed by the tubes 52, are formed independently from each other. The tanks 40, 41, 42 and the tubes 43 form the refrigerant flow passage of the evaporator 14. The tanks 50, 51 and the tubes 52 form the refrigerant flow passage of the condenser 21. Therefore, the refrigerant flow passage of the evaporator 14 and the refrigerant flow passage of the condenser 21 are formed independently from each other. In this way, the refrigeration cycle 10 and the refrigerant circulation circuit 20 are formed independently from each other.

In the condenser 21 of the present embodiment, a refrigerant flow direction, which is a flow direction of the refrigerant, is set in a direction that is directed further downward in comparison to a horizontal direction.

The evaporator 22 includes tanks 22b, 22c and a plurality of tubes 22a. The tank 22c distributes the refrigerant, which is conducted from the tank 51, to the tubes 22a. The tank 22b collects the refrigerant, which is conducted through the tubes 22a, and supplies this collected refrigerant to the tank 50.

Here, the tank 51 is placed on the lower side of the tank 50 in the top-to-bottom direction and is placed on the upper side of the tank 22c in the top-to-bottom direction. The tank 22b is placed on the upper side of the tank 22c in the top-to-bottom direction and is placed on the lower side of the tank 50 in the top-to-bottom direction.

In the evaporator 22 of the present embodiment, the refrigerant flow direction, which is the flow direction of the refrigerant, is set in a direction that is directed further upward in comparison to the horizontal direction.

Here, a refrigerant pipe 60, which conducts liquid refrigerant, is connected between the tank 51 and the tank 22c. Furthermore, a refrigerant pipe 61, which conducts gas refrigerant, is connected between the tank 50 and the tank 22b. An outer surface of each of the refrigerant pipes 60, 61 is covered with a heat insulating material 63.

Next, an operation of the in-vehicle refrigeration system 1 of the present embodiment will be described.

First of all, the compressor 11 suctions the refrigerant (i.e., the first refrigerant) from the evaporator 14. Then, the compressor 11 compresses the suctioned refrigerant to the high temperature and high pressure state and discharges the compressed refrigerant. This discharged refrigerant is guided into the condenser 12, and the gas refrigerant is condensed through the heat exchange with the outside air at the condenser 12. The refrigerant, which has passed through the condenser 12, is depressurized to the low pressure refrigerant at the pressure reducing valve 13. This low pressure refrigerant after the depressurization is evaporated by absorbing the heat from the cabin inside air at the evaporator 14. A subject inside air of the cabin, from which the heat is absorbed, is the air located at the front side of the cabin in the traveling direction of the automobile. This refrigerant after the evaporation is suctioned into the compressor 11 once again.

In contrast, at the condenser 21, the tank 50 distributes the refrigerant, which is conducted from the tank 22b of the evaporator 22, to the tubes 52.

The inside air passes between each adjacent two of the tubes 43, between which the corrugated fins 44 are held. The inside air is the front side air located at the front side of the cabin in the traveling direction of the automobile. The first refrigerant, which is conducted through the tubes 43, absorbs the heat from this inside air and is evaporated. Therefore, the inside air is cooled by the first refrigerant. Furthermore, the first refrigerant, which flows in the corresponding two of the tubes 43 that hold the corresponding tube 52 therebetween, exchanges the heat with the second refrigerant, which flows in this tube 52.

At this time, the second refrigerant is cooled and is condensed by the first refrigerant, so that the second refrigerant becomes the liquid refrigerant. This liquid refrigerant flows toward the tank 22c through the refrigerant pipe 60 by natural convection. The tank 22c distributes the liquid refrigerant to the tubes 22a. The refrigerant, which flows through the tubes 22a, absorbs the heat from the cabin inside air and is evaporated to become the gas refrigerant. As discussed above, the second refrigerant in the tubes 22a absorbs the heat from the cabin inside air, so that a specific gravity of the second refrigerant is reduced. This cabin inside air is the rear side air located at the rear side of the cabin in the traveling direction of the automobile. Therefore, the second refrigerant, which is the gas refrigerant, flows by the natural convection from the tank 22b into the tank 50 through the refrigerant pipe 61.

According to the present embodiment discussed above, in the in-vehicle refrigeration system 1, the evaporator 14 cooperates with the compressor 11, which compresses the first refrigerant including the lubricant oil, to constitute the refrigeration cycle 10, which circulates the first refrigerant, and the evaporator 14 evaporates the first refrigerant when the first refrigerant absorbs the heat from the second refrigerant at the evaporator 14. The condenser 21 condenses the second refrigerant when the heat of the second refrigerant is absorbed by the first refrigerant at the condenser 21. The evaporator 22 cooperates with the condenser 21 to constitute the refrigerant circulation circuit 20, in which the second refrigerant is circulated. Furthermore, the evaporator 22 evaporates the second refrigerant when the second refrigerant absorbs the heat from the air located at the rear side of the cabin in the traveling direction of the automobile (serving as a first cooling subject and a primary cooling subject) at the evaporator 22.

The refrigerant flow passage, which is formed by the tanks 40, 41, 42 of the evaporator 14, and the refrigerant flow passage, which is formed by the tanks 50, 51 of the condenser 21, are formed independently from each other. Each of the tubes 52 is clamped between the corresponding adjacent two of the tubes 43, so that the refrigerant flow passage, which is formed by the tubes 43, and the refrigerant flow passage, which is formed by the tubes 52, are formed independently from each other. Therefore, the refrigerant flow passage of the evaporator 14 and the refrigerant flow passage of the condenser 21 are formed independently from each other. Thus, the refrigeration cycle 10 and the refrigerant circulation circuit 20 are formed independently from each other.

Thereby, in the in-vehicle refrigeration system 1, the refrigeration cycle 10, which includes the compressor 11 and the evaporator 14, and the refrigerant circulation circuit 20, which includes the evaporator 22, can be separated from each other. As a result, mixing of the first refrigerant and the second refrigerant does not occur. Thus, it is possible to avoid the circulation of the lubricant oil, which is contained in the first refrigerant, through the refrigerant circulation circuit 20. Therefore, the accumulation of the lubricant oil at the evaporator 22 side is alleviated. Thereby, the lubricant oil can be more easily returned to the compressor 11, so that it is possible to avoid the shortage of the lubricant oil at the compressor 11. In this way, the quality of the compressor 11 can be improved.

In the present embodiment, at the refrigerant heat exchanger 30, the tubes 52 are spaced from each other and are arranged one after another in the tube row direction, and each of the tubes 52 is clamped between the corresponding adjacent two of the tubes 43. Thus, the second refrigerant, which flows in the tubes 52, and the first refrigerant, which flows in the tubes 43, are not mixed with each other, so that the heat exchange between the first refrigerant and the second refrigerant can be effectively performed.

Like in the refrigeration system of the patent literatures 1 and 2 discussed above, in the dual air conditioning system, which is formed by the single refrigerant circulation circuit, the way of accumulating the oil varies depending on a difference in a combination of the components and/or a difference in the refrigerant pipe configuration. Therefore, it is required to determine the design specifications for the refrigerant pipe configuration and the electric control operation pattern for each individual automobile in order to limit the oil accumulation, and thereby it takes time and labor. Thus, it is difficult to standardize the design.

In contrast, in the present embodiment, as discussed above, the refrigeration cycle 10 and the refrigerant circulation circuit 20 are formed independently from each other.

Thus, it is not required to determine the design specifications for the refrigerant pipe configuration and the electric control operation pattern for each individual automobile in order to limit the oil accumulation.

Furthermore, according to the present embodiment, the oil return control operation is eliminated, so that the designing of the refrigerant return pipe configuration is eased, and the amount of labor for the designing is reduced. In addition, a temporal increase in the temperature of the air, which is discharged from the operated evaporator among the two evaporators, due to the oil accumulation control operation does not occur, and the stable temperature control operation of the cabin inside air can be implemented. Thus, the deterioration of the feeling of the occupant with respect to the cabin inside air temperature can be alleviated.

Furthermore, previously, one type of dual air conditioning system, in which the front-seat-side evaporator and the rear-seat-side evaporator are connected with each other through the single refrigerant circulation circuit, is configured such that an expansion valve and an electromagnetic valve are provided for each of the evaporators at an inlet side of the evaporator.

In contrast, in the present embodiment, as discussed above, the refrigeration cycle 10 and the refrigerant circulation circuit 20 are formed independently from each other. Therefore, it is not required to provide the expansion valve and the electromagnetic valve at the rear-seat-side evaporator, and it is not necessary to consider the lubricant oil that circulates through the rear-seat-side evaporator. Thereby, it is possible to reduce the amount of lubricant oil used for the refrigeration system. As a result, the costs can be reduced.

Furthermore, in the previously proposed refrigeration cycle, in which the two evaporators are connected in parallel between the refrigerant outlet of the condenser and the refrigerant inlet of the compressor, there is a case where an efficiency of the refrigeration cycle is deteriorated due to a difference in: a refrigerant evaporation temperature (or a refrigerant evaporation pressure); the amount of superheat; and/or the amount of pressure loss at a low pressure pipe between the two evaporators.

In contrast, in the present embodiment, as discussed above, the number of the evaporator connected to the refrigeration cycle 10 is one. Therefore, there is eliminated the influence of the difference in: the refrigerant evaporation temperature (or the refrigerant evaporation pressure); the amount of superheat; and/or the amount of pressure loss at the low pressure pipe between the two evaporators. As a result, the efficiency of the refrigeration cycle is improved, and the power saving is achieved.

Furthermore, it is no longer required to consider the difference in the required amount of refrigerant between the time of dual operation, which operations the two evaporators, and the independent operation, which operates only the front-seat-side evaporator.

Second Embodiment

In the first embodiment, there is described the example, in which the heat exchange between the first refrigerant and the second refrigerant and the heat exchange between the first refrigerant and the cabin inside air are performed by the single refrigerant heat exchanger 30. In the present embodiment, the heat exchange between the first refrigerant and the second refrigerant and the heat exchange between the first refrigerant and the cabin inside air are performed through independent heat exchangers.

Figure 4:
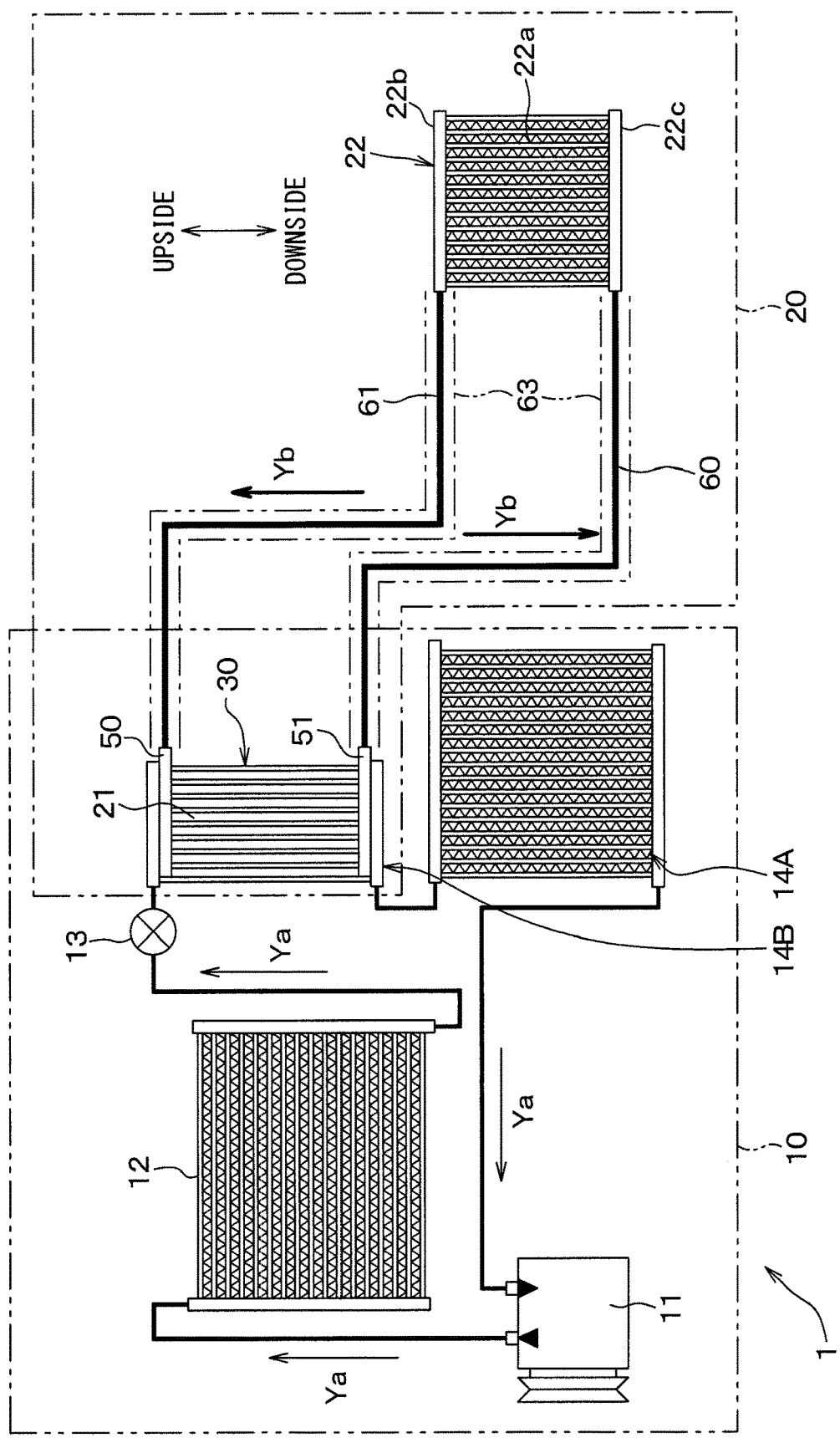
FIG. 4 is a view showing a structure of an in-vehicle refrigeration system according to a second embodiment.

FIG. 4 is an entire view of the in-vehicle refrigeration system 1 according to the second embodiment. The present embodiment and the first embodiment differ with respect to the construction of the evaporator, and the rest of the structure of the present embodiment is the same as that of the first embodiment and thereby will not be described for the sake of simplicity. In FIG. 4, components, which are indicated by the same reference signs as those of FIG. 3, are the same as the corresponding components indicated in FIG. 3 and will not be described again for the sake of simplicity.

In the in-vehicle refrigeration system of the present embodiment, two evaporators 14A, 14B are provided in place of the evaporator 14. The evaporators 14A, 14B are connected in series between the refrigerant outlet of the pressure reducing valve 13 and the refrigerant inlet of the compressor 11.

The evaporator 14A cools the cabin inside air through use of the first refrigerant. The evaporator 14B constitutes the refrigerant heat exchanger 30 in cooperation with the condenser 21. The evaporator 14B cools the second refrigerant, which is conducted through the condenser 21, through use of the first refrigerant.

(First Modification of Second Embodiment)

In the second embodiment, there is described the example, in which the evaporators 14A, 14B are connected in series between the refrigerant outlet of the pressure reducing valve 13 and the refrigerant inlet of the compressor 11. In the present modification, alternative to this configuration, as shown in FIG. 5, the evaporators 14A, 14B are connected in parallel between the refrigerant outlet of the pressure reducing valve 13 and the refrigerant inlet of the compressor 11.

Figure 5:
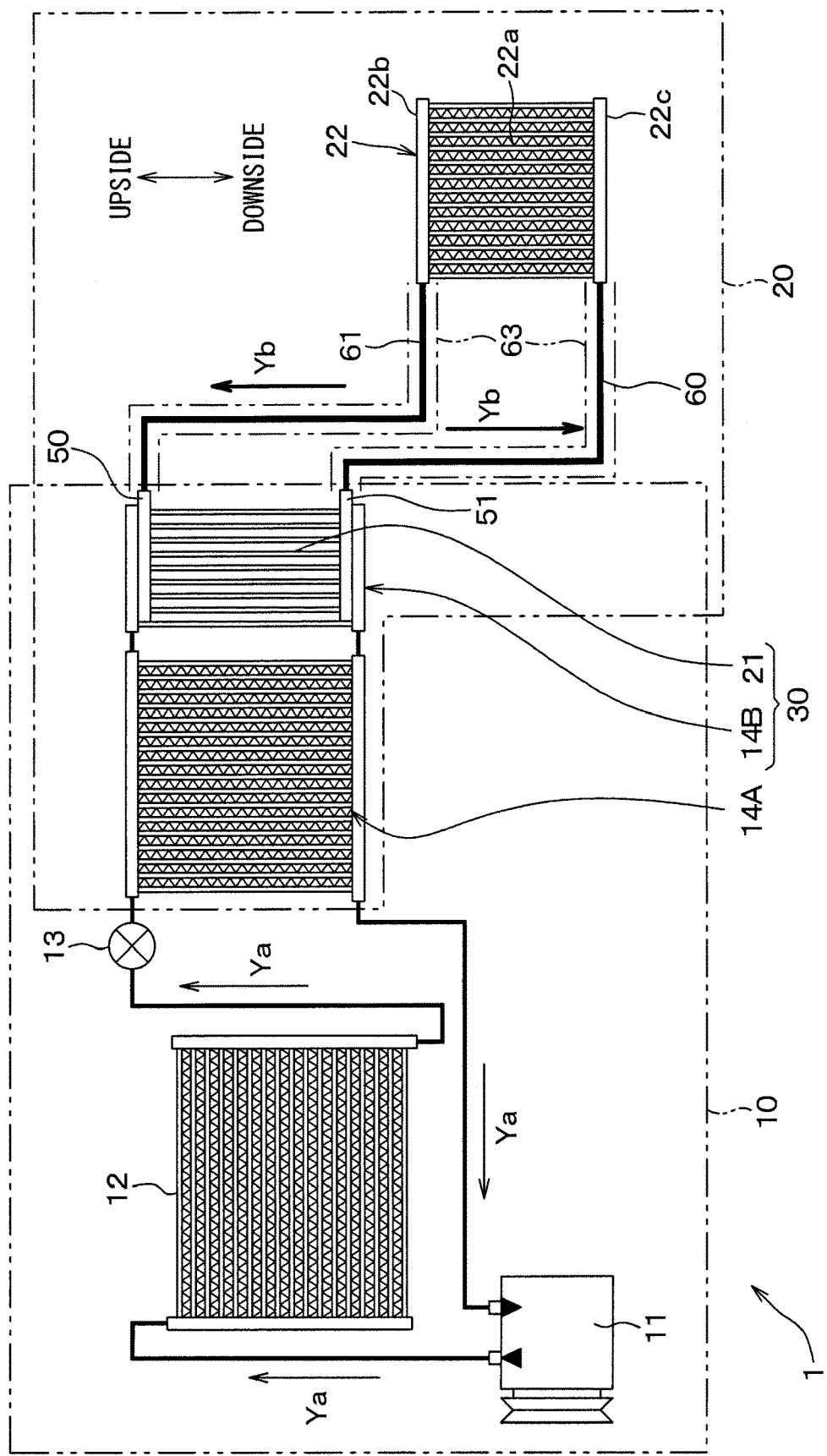
FIG. 5 is a view showing a structure of an in-vehicle refrigeration system of a first modification of the second embodiment.

FIG. 5 is an entire schematic diagram of the first modification of the in-vehicle refrigeration system 1. In FIG. 5, components, which are indicated by the same reference signs as those of FIG. 4, are the same as the corresponding components indicated in FIG. 4 and will not be described again for the sake of simplicity.

The evaporator 14A cools the cabin inside air through use of the first refrigerant. The evaporator 14B constitutes the refrigerant heat exchanger 30 in cooperation with the condenser 21. The evaporator 14B cools the second refrigerant, which is conducted through the condenser 21, through use of the first refrigerant.

Third Embodiment

In the first and second embodiments, the evaporator 22 constitutes the rear-seat-side air conditioning unit 3. In the present embodiment, alternative to this configuration, the evaporator 22 constitutes a seat air conditioning unit 70.

Figure 6A:
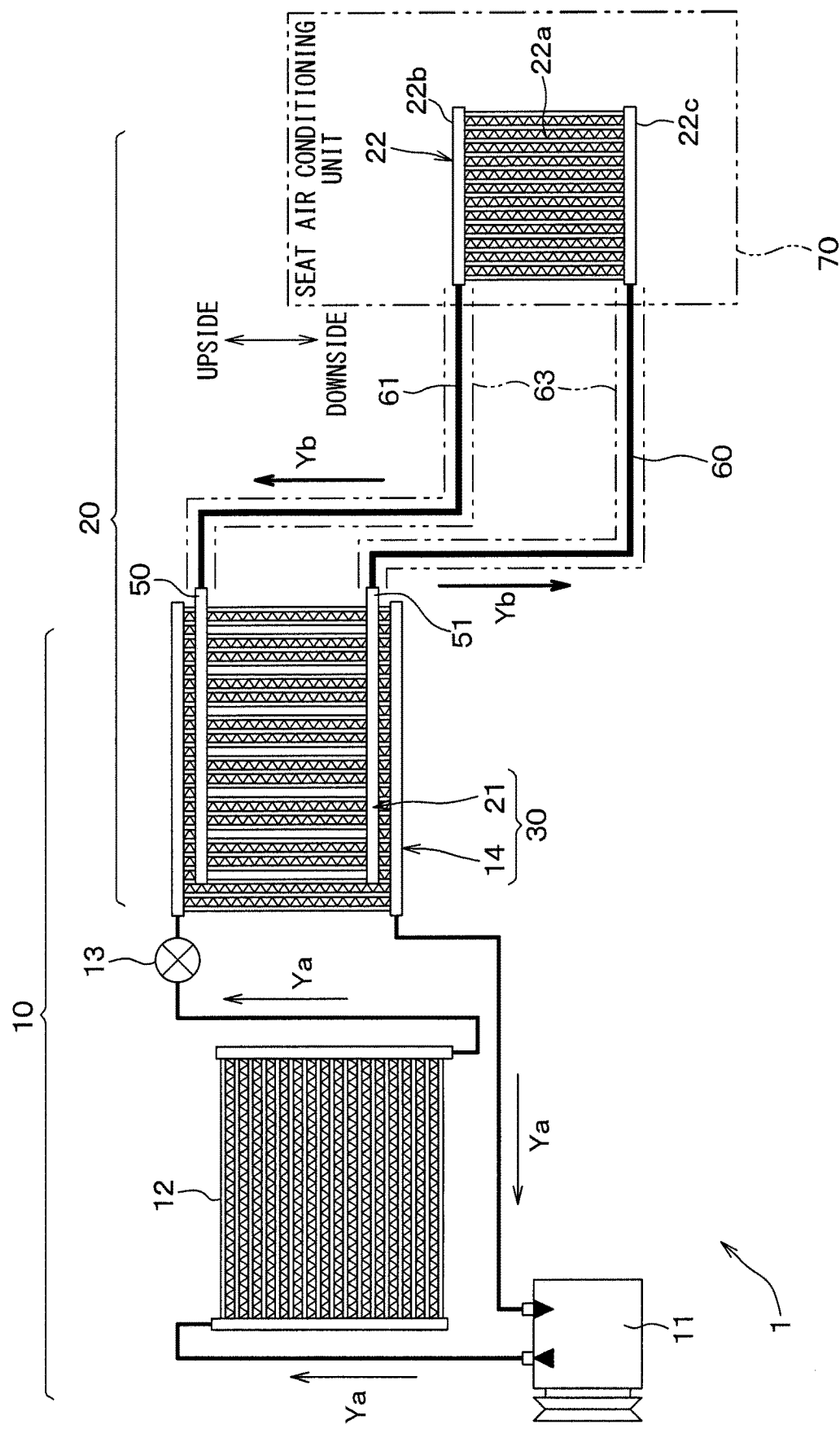
FIG. 6A is a view showing a structure of an in-vehicle refrigeration system according to a third embodiment.

FIG. 6A is an entire view of the in-vehicle refrigeration system 1 according to a third embodiment.

In FIG. 6A, components, which are indicated by the same reference signs as those of FIG. 3, are the same as the corresponding components indicated in FIG. 3 and will not be described again for the sake of simplicity.

The seat air conditioning unit 70 is a unit that cools the air to be discharged from a seat surface of a seat, on which the occupant is seated in the cabin of the automobile, through the evaporator 22. That is, the air, which is cooled by the second refrigerant at the evaporator 22, is discharged from the seat surface.

(First Modification of Third Embodiment)

Figure 6B:
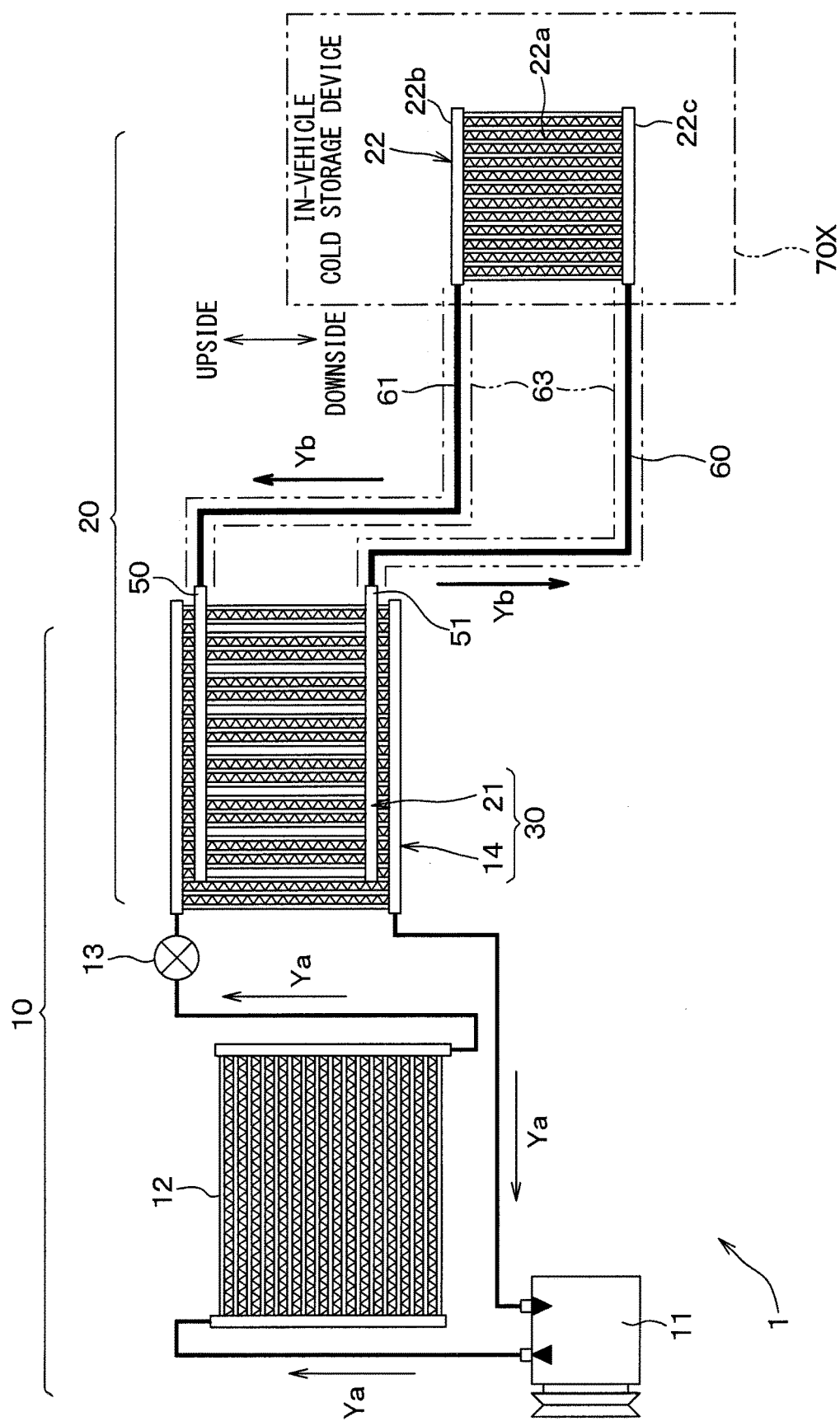
FIG. 6B is a view showing a structure of an in-vehicle refrigeration system of a first modification of the third embodiment.

In the third embodiment, the evaporator 22 constitutes the seat air conditioning unit 70. In the present modification, alternative to this configuration, an inside of an in-vehicle cold storage 70X of the automobile shown in FIG. 6B is cooled through the evaporator 22. Alternatively, an inside of a cool storage of the automobile may be cooled through the evaporator 22.

Fourth Embodiment

In the third embodiment, there is described the example, in which the evaporator 22 constitutes the seat air conditioning unit 70. In the present embodiment, alternative to this configuration, the evaporator 22 constitutes an in-vehicle electric device 70A of the automobile.

Figure 7:
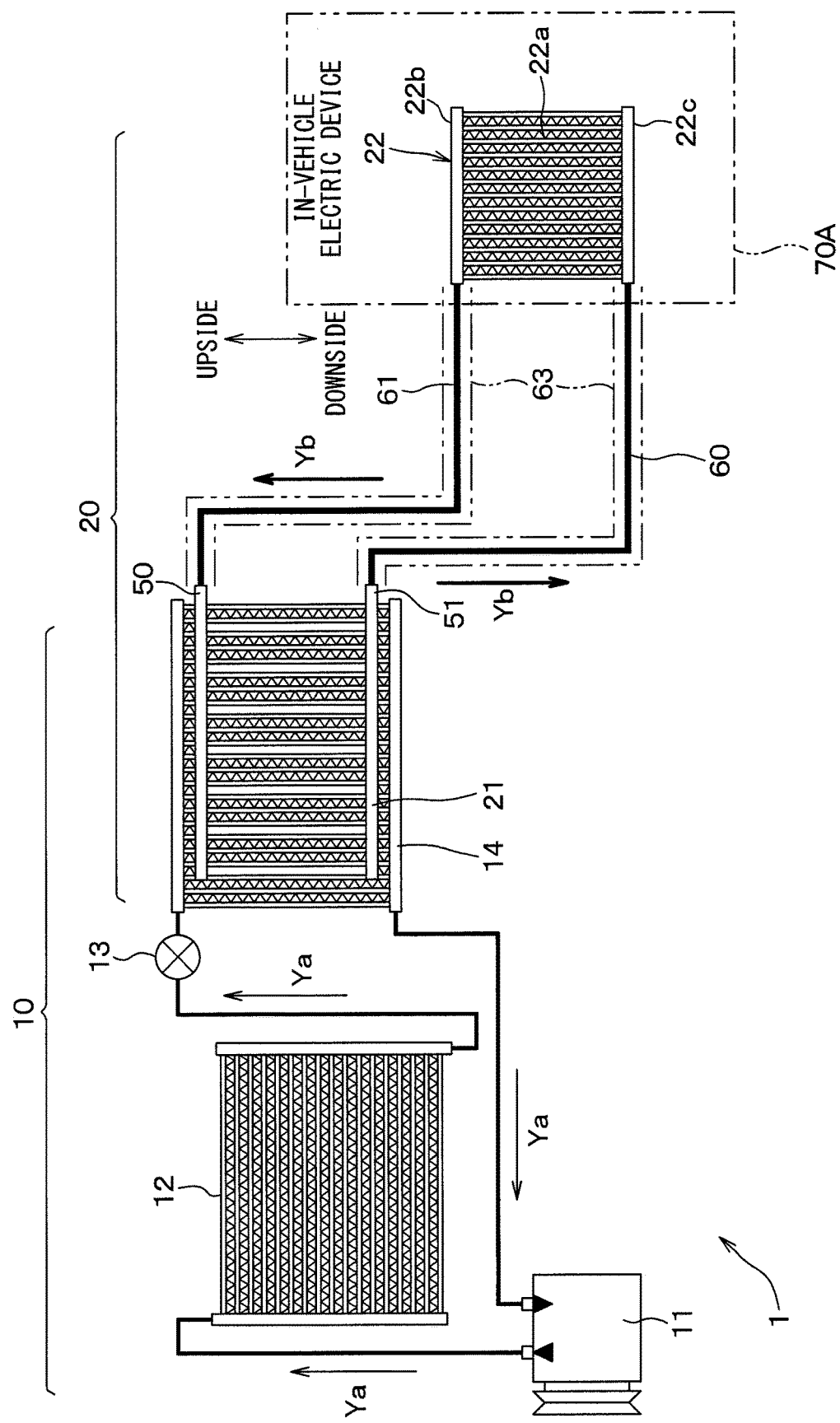
FIG. 7 is a view showing a structure of an in-vehicle refrigeration system according to a fourth embodiment.

FIG. 7 is an entire view of the in-vehicle refrigeration system 1 according to the fourth embodiment.

In FIG. 7, components, which are indicated by the same reference signs as those of FIG. 3, are the same as the corresponding components indicated in FIG. 3 and will not be described again for the sake of simplicity.

An in-vehicle battery of the automobile, a drive electric motor for driving the automobile, or an electric control device of the automobile may be used as the in-vehicle electric device 70A.

The vehicle drive electric motor generates a drive force that rotates drive wheels of the vehicle in response to an output electric power of the in-vehicle battery. For example, an AC motor may be used as the vehicle drive electric motor. The electric control device is an inverter circuit that outputs the alternating current to the vehicle drive electric motor according to the output electric power of the in-vehicle battery to drive the vehicle drive electric motor.

Fifth Embodiment

In a fifth embodiment, there will be described an example, in which an auxiliary pump for pumping liquid refrigerant is installed to the refrigerant circulation circuit 20 of the first embodiment.

Figure 8:
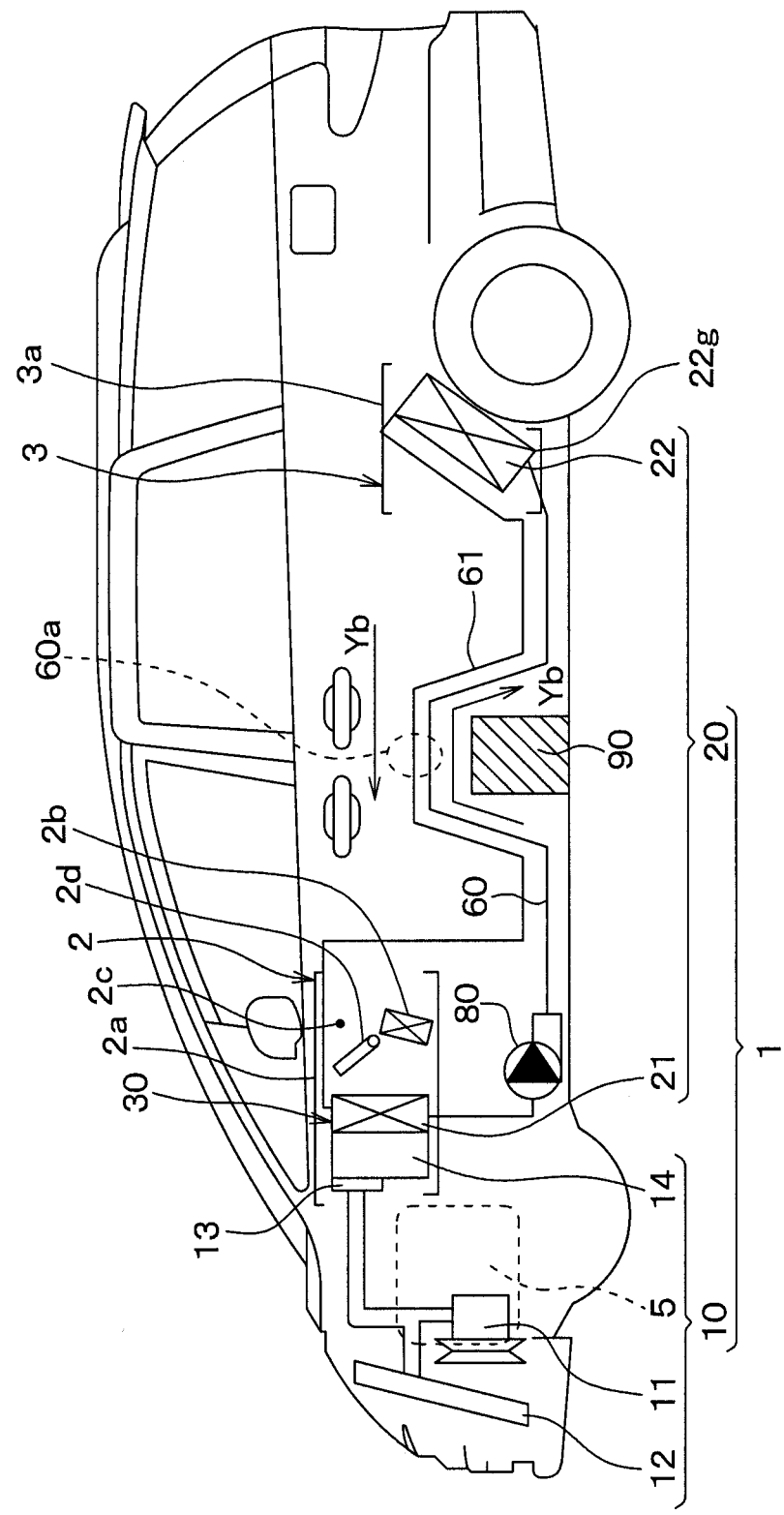
FIG. 8 is a view showing a structure of an in-vehicle refrigeration system according to a fifth embodiment.

FIG. 8 is an entire view of the in-vehicle refrigeration system 1 according to the fifth embodiment.

In FIG. 8, components, which are indicated by the same reference signs as those of FIG. 1, are the same as the corresponding components indicated in FIG. 1 and will not be described again for the sake of simplicity.

A circulation pump 80 for pumping liquid refrigerant is installed to the refrigerant pipe 60 of the refrigerant circulation circuit 20 of the present embodiment. The circulation pump 80 generates a flow of the liquid refrigerant, which is conducted in the refrigerant pipe 60 from the refrigerant outlet side (i.e., the tank 51 side) of the condenser 21 to the refrigerant inlet side (i.e., the tank 22c) of the evaporator 22. Therefore, the circulation pump 80 generates a flow of the second refrigerant to assist the circulation of the second refrigerant in the refrigerant circulation circuit 20 induced by the natural convection.

In the present embodiment, a frame 90 under a floor of the automobile projects upward. Therefore, the refrigerant pipes 60, 61 are arranged such that the refrigerant pipes 60, 61 extend beyond the frame 90. Therefore, a height of a highest portion 60a of the refrigerant pipes 60, 61 is higher than a lowest portion 22g of the evaporator 22.

In contrast, in the present embodiment, as discussed above, the circulation pump 80 for pumping the liquid refrigerant is installed to the refrigerant pipe 60 of the refrigerant circulation circuit 20. Because of this configuration, the refrigerant can be circulated in the refrigerant circulation circuit 20 beyond the highest portion 60a.

(First Modification of Fifth Embodiment)

In the fifth embodiment, there is described the example, in which the evaporator 22 constitutes the rear-seat-side air conditioning unit 3. In the present modification, alternative to this configuration, the evaporator 22 constitutes a ceiling-side air conditioning unit 3A.

Figure 9:
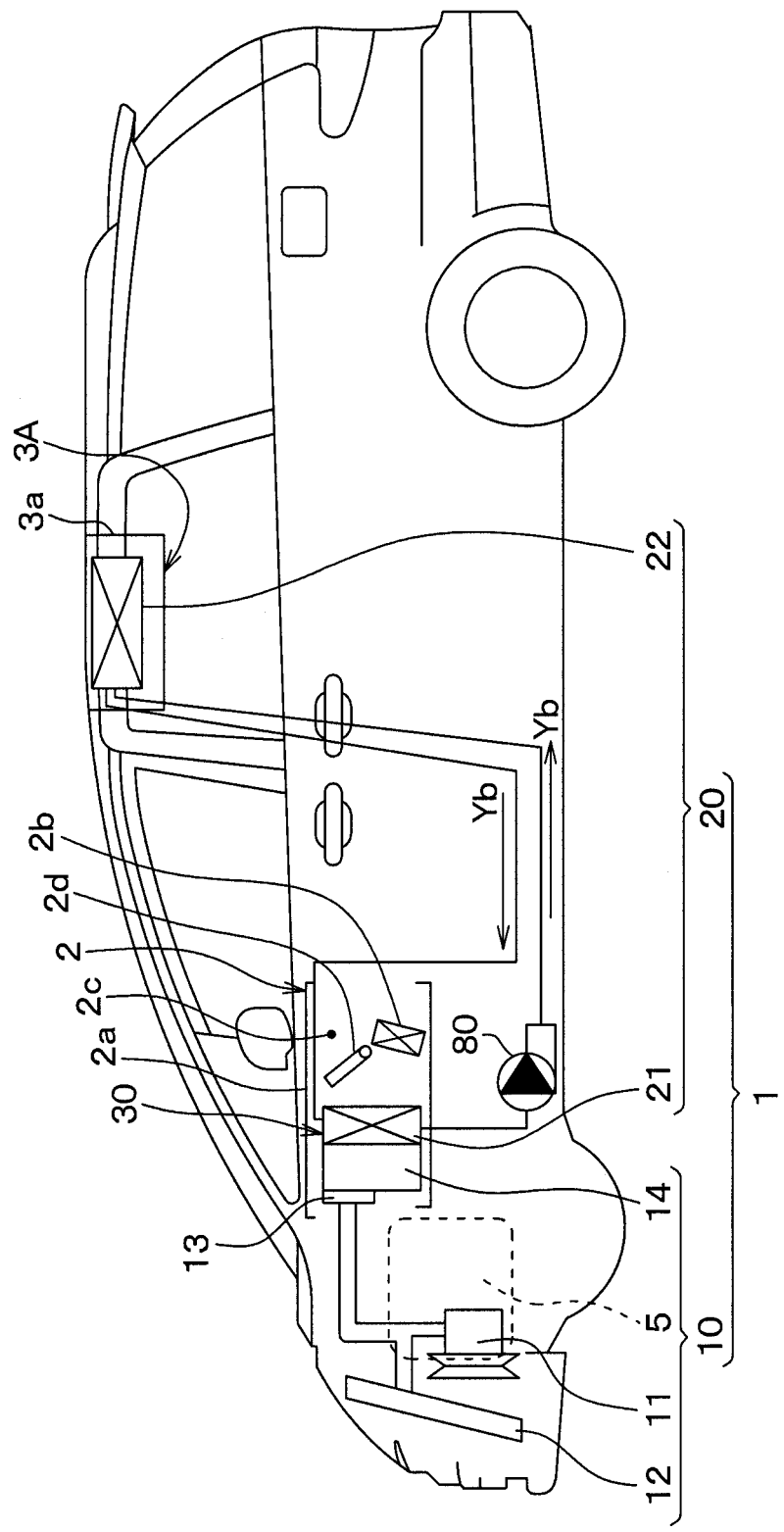
FIG. 9 is a view showing a structure of an in-vehicle refrigeration system of a first modification of the fifth embodiment.

FIG. 9 is an entire view of in-vehicle refrigeration system 1 of the first modification of the fifth embodiment. In FIG. 9, components, which are indicated by the same reference signs as those of FIG. 8, are the same as the corresponding components indicated in FIG. 8 and will not be described again for the sake of simplicity. The ceiling-side air conditioning unit 3A is placed at a ceiling-side of the cabin of the automobile and discharges the cabin inside air, which is cooled through the evaporator 22. In this case, the evaporator 22 is placed on the upper side of the condenser 21 in the top-to-bottom direction.

According to the present embodiment, the circulation pump 80 generates a flow of the second refrigerant to assist the circulation of the second refrigerant in the refrigerant circulation circuit 20 induced by the natural convection.

Sixth Embodiment

In the first embodiment, there is described the example, in which the single refrigerant circulation circuit 20 is provided in the in-vehicle refrigeration system 1. In the present embodiment, alternative to this configuration, two refrigerant circulation circuits 20A, 20B are provided in the in-vehicle refrigeration system 1.

Figure 10:
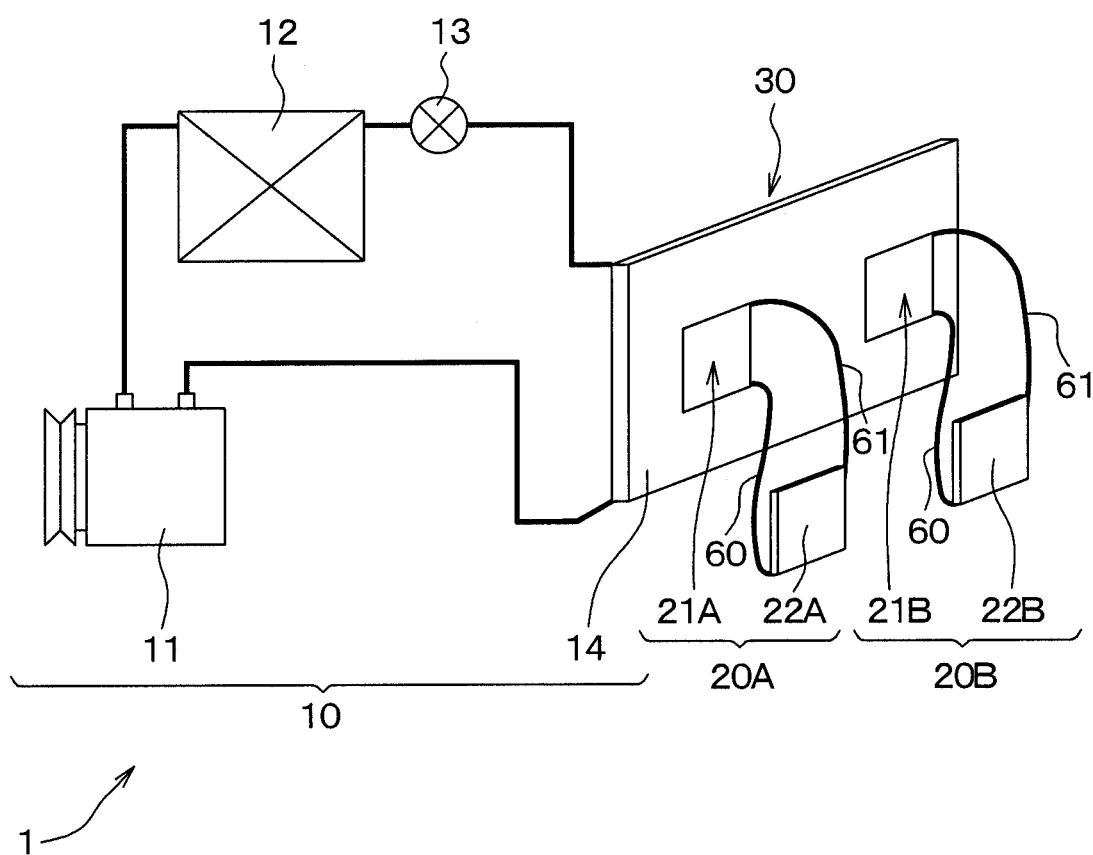
FIG. 10 is a view showing a structure of an in-vehicle refrigeration system according to a sixth embodiment.

FIG. 10 is an entire view of the in-vehicle refrigeration system 1 according to the sixth embodiment. In FIG. 10, components, which are indicated by the same reference signs as those of FIG. 3, are the same as the corresponding components indicated in FIG. 3 and will not be described again for the sake of simplicity.

Each of the refrigerant circulation circuits 20A, 20B circulates the second refrigerant. The refrigerant circulation circuits 20A, 20B are formed independently from each other. The refrigerant circulation circuit 20A corresponds to a first refrigerant circulation circuit and includes a condenser 21A and an evaporator 22A. The refrigerant circulation circuit 20B corresponds to a second refrigerant circulation circuit and includes a condenser 21B and an evaporator 22B.

Here, the condensers 21A, 21B and the evaporator 14 are constructed such that the second refrigerant, which is conducted through the refrigerant circulation circuit 20A, and the second refrigerant, which is conducted through the refrigerant circulation circuit 20B, are not mixed with each other.

The condensers 21A, 21B and the evaporator 14 constitute the refrigerant heat exchanger 30. The evaporator 14 conducts the first refrigerant to absorb the heat from the second refrigerant, which is conducted through the condensers 21A, 21B, and absorbs the heat from the air at the front side of the cabin of the automobile.

The condensers 21A, 21B are constructed in a manner similar to the condenser 21 of FIG. 1. The condensers 21A, 21B cool the second refrigerant through the heat exchange with the first refrigerant that is conducted through the evaporator 14. The condenser 21A corresponds to one of two or more condensers. The condenser 21B corresponds to another one of the two or more condensers, which is other than the one of the two or more condensers.

The evaporators 22A, 22B are constructed in a manner similar to the evaporator 22 of FIG. 1. The evaporators 22A, 22B cools the air at the rear side of the cabin in the traveling direction of the automobile. The evaporator 22A corresponds to one of two or more secondary evaporators. The evaporator 22B corresponds to another one of the two or more secondary evaporators, which is other than the one of the two or more secondary evaporators.

In the second embodiment, the condenser 21A and the evaporator 22A are connected with each other through corresponding refrigerant pipes 60, 61. The condenser 21B and the evaporator 22B are connected with each other through corresponding refrigerant pipes 60, 61.

Seventh Embodiment

In a seventh embodiment, there will be described an example, in which a cold-storage heat exchanger is provided in place of the evaporator of the refrigerant circulation circuit 20.

Figure 11:
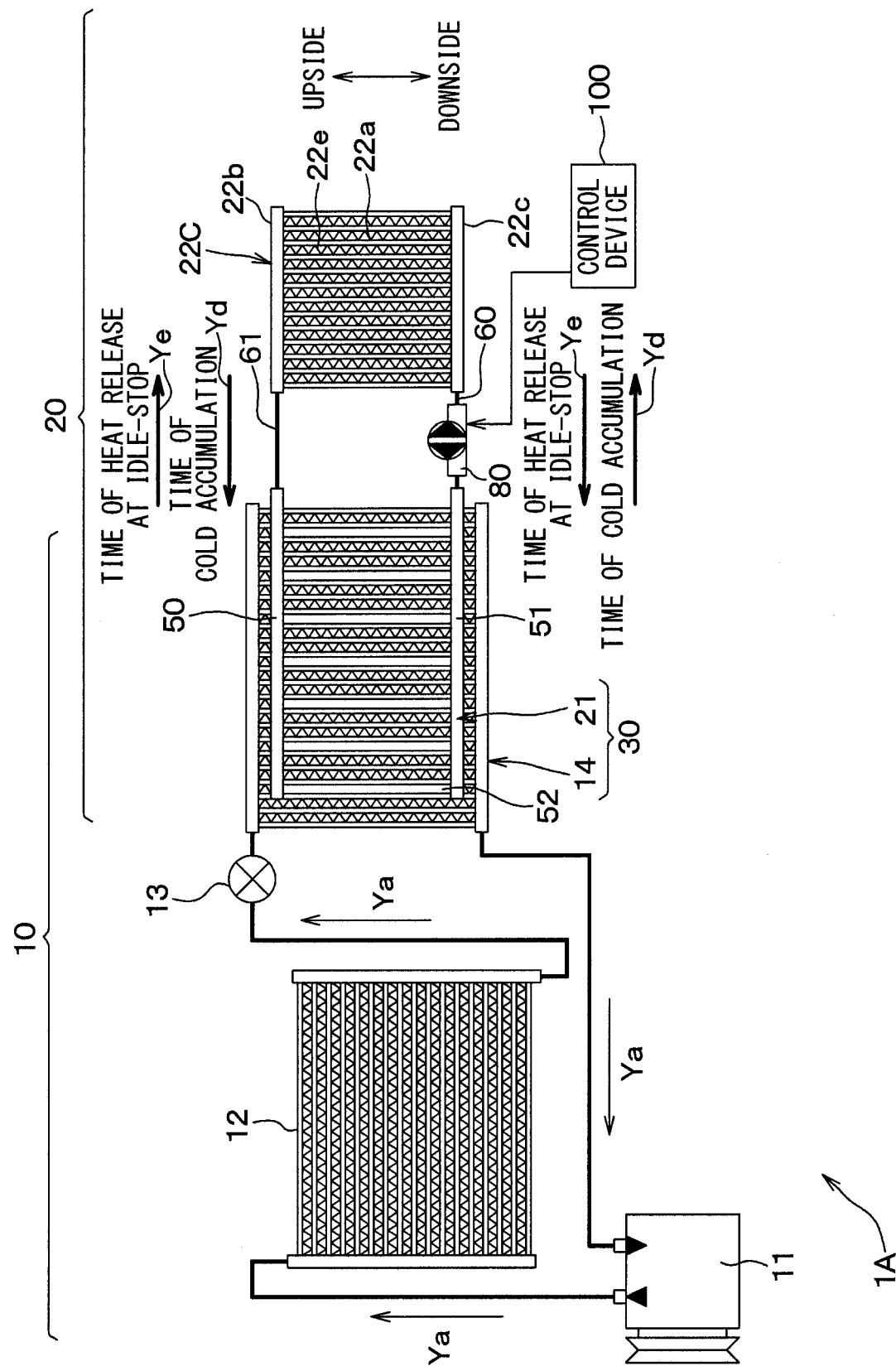
FIG. 11 is a view showing a structure of an in-vehicle refrigeration system according to a seventh embodiment.

FIG. 11 is an entire view of the in-vehicle refrigeration system 1 according to the seventh embodiment. In FIG. 11, components, which are indicated by the same reference signs as those of FIG. 3, are the same as the corresponding components indicated in FIG. 3 and will not be described again for the sake of simplicity.

The refrigerant circulation circuit 20 of the present embodiment includes the cold-storage heat exchanger 22C in place of the evaporator 22 of FIG. 1.

The cold-storage heat exchanger 22C includes tanks 22b, 22c and a plurality of tubes 22a. The tank 22c distributes the refrigerant, which is conducted from the tank 51 of the condenser 21, to the tubes 22a. The tank 22b collects the refrigerant, which is conducted through the tubes 22a, and supplies this collected refrigerant to the tank 50. The cold-storage material 22e is interposed between each adjacent two of the tubes 22a. The cold-storage material 22e is frozen to accumulate the cold when the cold-storage material 22e is cooled by the second refrigerant.

A refrigerant pipe 60 connects between the tank 51 of the condenser 21 and the tank 22c of the cold-storage heat exchanger 22C. A refrigerant pipe 61 connects between the tank 50 of the condenser 21 and the tank 22b of the cold-storage heat exchanger 22C. A circulation pump 80 for pumping the liquid refrigerant is installed to the refrigerant pipe 60. The circulation pump 80 is controlled by a control device 100. In the present embodiment, the tank 22c is placed on the lower side of the tank 22b in the top-to-bottom direction.

Next, the in-vehicle refrigeration system 1 of the present embodiment will be described.

At a cold accumulation mode, the control device 100 controls the circulation pump 80 such that the second refrigerant flows from the tank 22b to the tank 50 and also flows from the tank 51 to the tank 22c, as indicated by an arrow Yd. The cold accumulation mode is a mode for cooling the cold-storage material 22e by the second refrigerant.

At the cold accumulation mode, the tank 50 distributes the second refrigerant, which is conducted from the tank 22b, to the respective tubes 52, and the tank 51 collects the second refrigerant from the tubes 52 and supplies the collected second refrigerant to the tank 22c, as indicated by the arrow Yd. The tank 22c distributes the second refrigerant, which is received from the tank 51, to the respective tubes 22a, and the tank 22b collects the second refrigerant from the tubes 22a and supplies the collected second refrigerant to the tank 50.

At this time, the second refrigerant, which is conducted through the tubes 52, is condensed by releasing the heat to the first refrigerant, and the second refrigerant, which is conducted through the tubes 22a, absorbs the heat from the cold-storage material 22e. That is, the second refrigerant, which is conducted through the tubes 22a, freezes the cold-storage material 22e, and thereby the second refrigerant is evaporated.

At a cooling mode, the control device 100 controls the circulation pump 80 such that the second refrigerant flows from the tank 50 to the tank 22b and also flows from the tank 22c to the tank 51, as indicated by an arrow Ye. The cooling mode is a mode for releasing the heat from the second refrigerant to the cabin inside air at, for example, the idle-stop mode of the engine 5 of the automobile. At the idle-stop mode, the engine 5 is stopped, and thereby the compressor 11 is stopped.

At the cooling mode, the tank 22b distributes the second refrigerant, which is conducted from the tank 50, to the respective tubes 22a, and the tank 22c collects the second refrigerant from the tubes 22a and supplies the collected second refrigerant to the tank 51. The tank 51 distributes the refrigerant, which is conducted from the tank 22c, to the respective tubes 52. The tank 50 collects the second refrigerant from the tubes 52 and supplies the collected second refrigerant to the tank 22b.

The second refrigerant, which is conducted through the tubes 52, absorbs the heat from the cabin inside air. The cabin inside air is the air located at the front side of the cabin in the traveling direction of the automobile. Specifically, the second refrigerant, which is conducted through each of the tubes 52, absorbs the heat from the cabin inside air through the adjacent two tubes 43, between which the tube 52 is clamped. The second refrigerant, which is conducted through the tubes 22a, is cooled by the cold-storage material 22e.

Thereby, at the cold accumulation mode, the second refrigerant releases the heat to the first refrigerant, so that the second refrigerant is condensed. When this condensed second refrigerant is conducted through the tubes 22a, the second refrigerant freezes the cold-storage material 22e. At the cooling mode, the second refrigerant, which is conducted through the tubes 22a, is cooled by the cold-storage material 22e and is thereby condensed. The second refrigerant, which is conducted through each of the tubes 52, absorbs the heat from the cabin inside air through the adjacent two tubes 43, between which the tubes 52 is clamped, and thereby the second refrigerant is evaporated. Therefore, the cabin inside air can be cooled by the cold-storage material 22e when the cooling capacity is in shortage at the time of, for example, the idle-stop of the engine.

Other Embodiments (1) In the first to seventh embodiments, there is described the examples, in each of which the in-vehicle refrigeration system 1 is applied to the automobile. Alternatively, the in-vehicle refrigeration system 1 may be applied to another type of vehicle (e.g., an electric train or a train), which is other than the automobile, or a refrigeration system of an installation type.

(2) In the sixth embodiment, there is described the example where the two refrigerant circulation circuits 20A, 20B are formed. Alternatively, three of more refrigerant circulation circuits may be formed.

(3) The present disclosure should not be limited to the above embodiments, and the above embodiments may be modified in various appropriate ways. The above embodiments are not necessarily unrelated to each other and can be combined in any appropriate combination unless such a combination is obviously impossible. The constituent component(s) of each of the above embodiments is/are not necessarily essential unless it is specifically stated that the constituent component(s) is/are essential in the above embodiment, or unless the component(s) is/are obviously essential in principle. Furthermore, in each of the above embodiments, in the case where the number of the component(s), the value, the amount, the range, and/or the like is specified, the present disclosure is not necessarily limited to the number of the component(s), the value, the amount, and/or the like specified in the embodiment unless the number of the component(s), the value, the amount, and/or the like is indicated as indispensable or is obviously indispensable in view of the principle of the present disclosure. Furthermore, in each of the above embodiments, in the case where the shape of the component(s) and/or the positional relationship of the component(s) are specified, the present disclosure is not necessarily limited to the shape of the component(s) and/or the positional relationship of the component(s) unless the embodiment specifically states that the shape of the component(s) and/or the positional relationship of the component(s) is/are necessary or is/are obviously essential in principle.

In the above embodiments, the in-vehicle refrigeration system 1 corresponds to a refrigeration system, and the evaporator 14A corresponds to a secondary heat exchanger. The evaporator 14B corresponds to a primary evaporator, and the evaporator 22 corresponds to a secondary evaporator. The tubes 22a correspond to secondary tubes. The tank 22b and the tank 22c correspond to a fourth tank and a third tank, respectively. The refrigerant heat exchanger 30 corresponds to a heat exchanger and a primary heat exchanger. The tubes 52 correspond to primary tubes. The tank 50 and the tank 51 correspond to a first tank and a second tank, respectively. The tubes 43 correspond to tertiary tubes. The tank 40 corresponds to a fifth tank. The tank 41 corresponds to a sixth tank. The circulation pump 80 corresponds to an auxiliary pump.

What is claimed is:

1. A refrigeration system comprising:
a primary evaporator that constitutes a refrigeration cycle in corporation with a compressor, which compresses a first refrigerant that includes lubricant oil, wherein the refrigeration cycle circulates the first refrigerant, and the primary evaporator absorbs heat from a second refrigerant and thereby evaporates the first refrigerant;
a condenser that releases heat from the second refrigerant to the first refrigerant and thereby condenses the second refrigerant; and
a secondary evaporator that constitutes a refrigerant circulation circuit, which circulates the second refrigerant, in corporation with the condenser, wherein the secondary evaporator absorbs heat from a primary cooling subject and thereby evaporates the second refrigerant after the second refrigerant is condensed, wherein:
a refrigerant flow passage of the primary evaporator and a refrigerant flow passage of the condenser are formed independently from each other, and thereby the refrigeration cycle and the refrigerant circulation circuit are formed independently from each other;
the primary evaporator and the condenser constitute a heat exchanger that exchanges heat between the first refrigerant and the second refrigerant and uses the first refrigerant to cool the second refrigerant and an additional cooling subject while the additional cooling subject is other than the second refrigerant;
the condenser includes a plurality of tubes, which conduct the second refrigerant;
the primary evaporator includes a plurality of tubes, which conduct the first refrigerant, and a plurality of fins, through which heat exchange between the first refrigerant and the additional cooling subject is carried out; and
the plurality of tubes of the condenser, the plurality of tubes of the primary evaporator and the plurality of fins of the primary evaporator are stacked together.

2. The refrigeration system according to claim 1, wherein:
the plurality of tubes of the condenser is a plurality of primary tubes;
the condenser includes:
a first tank that distributes the second refrigerant, which is evaporated by the secondary evaporator, to each of the plurality of primary tubes; and
a second tank that collects the second refrigerant from the plurality of primary tubes and thereafter conducts the second refrigerant to the secondary evaporator side, wherein the second refrigerant, which flows in the plurality of primary tubes, releases heat to the first refrigerant and thereby condenses; and
the secondary evaporator includes:
a plurality of secondary tubes that respectively conduct the second refrigerant;
a third tank that distributes the second refrigerant to each of the plurality of secondary tubes after the second refrigerant is condensed; and
a fourth tank that collects the second refrigerant from the plurality of secondary tubes and thereafter guides the second refrigerant toward the first tank, wherein the second refrigerant, which flows in the plurality of secondary tubes, absorbs heat from the primary cooling subject and thereby evaporates.

3. The refrigeration system according to claim 2, wherein:
the plurality of tubes of the primary evaporator is a plurality of tertiary tubes;
the primary evaporator includes:
a fifth tank that distributes the first refrigerant to each of the plurality of tertiary tubes; and
a sixth tank that collects the first refrigerant from the plurality of tertiary tubes and thereafter guides the first refrigerant toward an inlet of the compressor;
a refrigerant flow passage, which is formed by the fifth tank and the sixth tank, and a refrigerant flow passage, which is formed by the first tank and the second tank, are formed independently from each other;
each of the plurality of primary tubes is placed between corresponding adjacent two of the plurality of tertiary tubes, so that a refrigerant flow passage, which is formed by the plurality of primary tubes, and a refrigerant flow passage, which is formed by the plurality of tertiary tubes, are formed independently from each other; and
the second refrigerant, which flows through each of the plurality of primary tubes placed between the corresponding adjacent two of the plurality of tertiary tubes, is cooled by the first refrigerant, which flows through the corresponding adjacent two of the plurality of tertiary tubes.

4. The refrigeration system according to claim 3, wherein:
the second tank is placed on a lower side of the first tank in a top-to-bottom direction and is placed on an upper side of the third tank in the top-to-bottom direction;

the fourth tank is placed on the upper side of the third tank in the top-to-bottom direction and is placed on the lower side of the first tank in the top-to-bottom direction; and the second refrigerant flows by natural convection from the first tank to the third tank through the plurality of primary tubes and the second tank and further from the third tank to the first tank through the plurality of secondary tubes and the fourth tank.

5. The refrigeration system according to claim 4, wherein:

an auxiliary pump is installed at the refrigerant circulation circuit such that the auxiliary pump generates a flow of the second refrigerant to assist the flowing of the second refrigerant by the natural convection.

6. An in-vehicle refrigeration system comprising:

the refrigeration system of claim 2, wherein a cold-storage material, which serves as the primary cooling subject, is provided at the secondary evaporator, and the primary evaporator cools the second refrigerant and inside air of a vehicle cabin by using the first refrigerant;

a circulation pump that generates a flow of the second refrigerant that flows from one of the second tank and the third tank to the other one of the second tank and the third tank to circulate the second refrigerant in the refrigerant circulation circuit; and a control device that controls the circulation pump, wherein:

the control device controls the circulation pump such that the second refrigerant flows from the second tank to the third tank at a cold accumulation mode;

at the cold accumulation mode, heat of the second refrigerant is absorbed by the first refrigerant at a time of flowing the second refrigerant in the plurality of primary tubes from the first tank, and the cold-storage material is cooled by the second refrigerant at a time of flowing the second refrigerant in the plurality of secondary tubes from the third tank;

at a cooling mode, the control device controls the circulation pump such that the second refrigerant flows from the third tank to the second tank; and at the cooling mode, the second tank distributes the second refrigerant, which is received from the third tank, to each of the plurality of primary tubes, and the first tank collects the second refrigerant from the plurality of primary tubes and thereafter supplies the second refrigerant to the fourth tank, and the fourth tank distributes the second refrigerant, which is received from the first tank, to each of the plurality of secondary tubes, and the third tank collects the secondary refrigerant from the plurality of secondary tubes and thereafter supplies the secondary refrigerant to the second tank, and the second refrigerant, which flows in the plurality of secondary tubes, is cooled by the cold-storage material, and inside air of the vehicle cabin is cooled by the second refrigerant, which is previously cooled by the cold-storage material, at a time of flowing the second refrigerant in the plurality of primary tubes.

7. The refrigeration system according to claim 1, wherein:

the refrigeration system is to be installed to an automobile; and the primary cooling subject is air at a rear side of a cabin of the automobile in a traveling direction of the automobile, and the additional cooling subject is air at a front side of the cabin of the automobile in the traveling direction of the automobile.

8. The refrigeration system according to claim 1, wherein:

the refrigeration system is to be installed to an automobile; and the secondary evaporator cools an inside of an in-vehicle cold storage of the automobile, which serves as the primary cooling subject.

9. The refrigeration system according to claim 1, wherein:

the refrigeration system is to be installed to an automobile; and the secondary evaporator cools air that serves as the primary cooling subject and is to be discharged from a seat surface of a seat, on which an occupant is seated, in a cabin of the automobile.

10. The refrigeration system according to claim 1, wherein:

the refrigeration system is to be installed to an automobile; and the secondary evaporator cools an in-vehicle electric device of the automobile, which serves as the primary cooling subject.

11. The refrigeration system according to claim 1, wherein:

each of the plurality of tubes of the condenser is held between and contacts corresponding two of the plurality of tubes of the primary evaporator; and each of the plurality of fins is held between and contacts corresponding two of the plurality of tubes of the primary evaporator.

12. An in-vehicle refrigeration system comprising:

a primary evaporator that constitutes a refrigeration cycle in corporation with a compressor, which compresses a first refrigerant that includes lubricant oil, wherein the refrigeration cycle circulates the first refrigerant, and the primary evaporator absorbs heat from a second refrigerant and thereby evaporates the first refrigerant;

a condenser that releases heat from the second refrigerant to the first refrigerant and thereby condenses the second refrigerant; and a secondary evaporator that constitutes a refrigerant circulation circuit, which circulates the second refrigerant, in corporation with the condenser, wherein the secondary evaporator absorbs heat from a primary cooling subject and thereby evaporates the second refrigerant after the second refrigerant is condensed, wherein:

a refrigerant flow passage of the primary evaporator and a refrigerant flow passage of the condenser are formed independently from each other, and thereby the refrigeration cycle and the refrigerant circulation circuit are formed independently from each other, wherein:

the condenser includes:

a plurality of primary tubes that respectively conduct the second refrigerant;

a first tank that distributes the second refrigerant, which is evaporated by the secondary evaporator, to each of the plurality of primary tubes; and a second tank that collects the second refrigerant from the plurality of primary tubes and thereafter conducts the second refrigerant to the secondary evaporator side, wherein the second refrigerant, which flows in the plurality of primary tubes, releases heat to the first refrigerant and thereby condenses; and the secondary evaporator includes:

a plurality of secondary tubes that respectively conduct the second refrigerant;

a third tank that distributes the second refrigerant to each of the plurality of secondary tubes after the second refrigerant is condensed; and a fourth tank that collects the second refrigerant from the plurality of secondary tubes and thereafter guides the second refrigerant toward the first tank, wherein the second refrigerant, which flows in the plurality of secondary tubes, absorbs heat from the primary cooling subject and thereby evaporates;

a cold-storage material, which serves as the primary cooling subject, is provided at the secondary evaporator, and the primary evaporator cools the second refrigerant and inside air of a vehicle cabin by using the first refrigerant;

a circulation pump that generates a flow of the second refrigerant that flows from one of the second tank and the third tank to the other one of the second tank and the third tank to circulate the second refrigerant in the refrigerant circulation circuit; and a control device that controls the circulation pump, wherein:

the control device controls the circulation pump such that the second refrigerant flows from the second tank to the third tank at a cold accumulation mode;

at the cold accumulation mode, heat of the second refrigerant is absorbed by the first refrigerant at a time of flowing the second refrigerant in the plurality of primary tubes from the first tank, and the cold-storage material is cooled by the second refrigerant at a time of flowing the second refrigerant in the plurality of secondary tubes from the third tank;

at a cooling mode, the control device controls the circulation pump such that the second refrigerant flows from the third tank to the second tank; and at the cooling mode, the second tank distributes the second refrigerant, which is received from the third tank, to each of the plurality of primary tubes, and the first tank collects the second refrigerant from the plurality of primary tubes and thereafter supplies the second refrigerant to the fourth tank, and the fourth tank distributes the second refrigerant, which is received from the first tank, to each of the plurality of secondary tubes, and the third tank collects the secondary refrigerant from the plurality of secondary tubes and thereafter supplies the secondary refrigerant to the second tank, and the second refrigerant, which flows in the plurality of secondary tubes, is cooled by the cold-storage material, and inside air of the vehicle cabin is cooled by the second refrigerant, which is previously cooled by the cold-storage material, at a time of flowing the second refrigerant in the plurality of primary tubes.

13. A refrigeration system for a vehicle, comprising:

a primary evaporator that constitutes a refrigeration cycle in corporation with a compressor, which compresses a first refrigerant that includes lubricant oil, wherein the refrigeration cycle circulates the first refrigerant, and the primary evaporator absorbs heat from a second refrigerant and thereby evaporates the first refrigerant;

a condenser that releases heat from the second refrigerant to the first refrigerant and thereby condenses the second refrigerant; and a secondary evaporator that constitutes a refrigerant circulation circuit, which circulates the second refrigerant, in corporation with the condenser, wherein the secondary evaporator absorbs heat from a primary cooling subject and thereby evaporates the second refrigerant after the second refrigerant is condensed, wherein:

a refrigerant flow passage of the primary evaporator and a refrigerant flow passage of the condenser are formed independently from each other, and thereby the refrigeration cycle and the refrigerant circulation circuit are formed independently from each other; and the secondary evaporator is placed at a rear side of the vehicle in a traveling direction of the vehicle to absorb heat from air, which serves as the primary cooling subject and is located at a rear side of a cabin of the vehicle in the traveling direction of the vehicle.

14. The refrigeration system according to claim 13, wherein:

the primary evaporator constitutes a heat exchanger that uses the first refrigerant to cool the second refrigerant and an additional cooling subject while the additional cooling subject is other than the second refrigerant; and the additional cooling subject is air at a front side of the cabin of the vehicle in the traveling direction of the vehicle.

15. The refrigeration system according to claim 13, wherein:

the primary evaporator and the condenser constitute a primary heat exchanger that uses the first refrigerant to cool the second refrigerant;

the refrigeration system comprises a secondary heat exchanger that uses the first refrigerant to cool an additional cooling subject;

the additional cooling subject is air at a front side of the cabin of the vehicle in the traveling direction of the vehicle; and the primary heat exchanger and the secondary heat exchanger are arranged in series in a flow direction of the first refrigerant at a corresponding location that is between an inlet and an outlet of the compressor.

* * * * *